(12) United States Patent
Silvernail et al.

(10) Patent No.: US 10,893,673 B2
(45) Date of Patent: Jan. 19, 2021

(54) QUATERNARY DISINFECTANT COMPOSITION WITH ANIONIC SCALE INHIBITING AGENT

(71) Applicant: ECOLAB USA INC, Saint Paul, MN (US)

(72) Inventors: Carter M. Silvernail, Saint Paul, MN (US); Stefan Jaeger, Saint Paul, MN (US); Erin J. Dahlquist Howlett, Saint Paul, MN (US); Michael Decker, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 16/163,417

(22) Filed: Oct. 17, 2018

(65) Prior Publication Data

US 2019/0183117 A1    Jun. 20, 2019

Related U.S. Application Data

(63) Continuation of application No. 15/171,828, filed on Jun. 2, 2016, now abandoned.

(51) Int. Cl.
| | | |
|---|---|---|
| *A01N 25/22* | (2006.01) | |
| *A01N 33/04* | (2006.01) | |
| *A01N 33/12* | (2006.01) | |
| *A01N 25/02* | (2006.01) | |
| *A01N 57/20* | (2006.01) | |

(52) U.S. Cl.
CPC .............. *A01N 25/22* (2013.01); *A01N 25/02* (2013.01); *A01N 33/04* (2013.01); *A01N 33/12* (2013.01); *A01N 57/20* (2013.01)

(58) Field of Classification Search
CPC ........ A01N 25/22; A01N 25/02; A01N 57/20; A01N 33/04; A01N 33/12
See application file for complete search history.

(56) References Cited

U.S. PATENT DOCUMENTS

| 6,395,698 B1 | 5/2002 | Daun et al. |
|---|---|---|
| 2011/0086791 A1 | 4/2011 | Notte et al. |
| 2016/0015030 A1 | 1/2016 | Vanlaer |

FOREIGN PATENT DOCUMENTS

| EP | 0343605 A1 | 11/1989 |
|---|---|---|
| EP | 1277403 B1 | 9/2005 |
| WO | 2009080498 A1 | 7/2009 |
| WO | 2012121964 A1 | 9/2012 |
| WO | 2015078496 A1 | 6/2015 |

*Primary Examiner* — Robert S Cabral
(74) *Attorney, Agent, or Firm* — McKee, Voorhees & Sease, PLC

(57) ABSTRACT

The present invention relates to quaternary ammonium disinfecting cleaner compositions comprising a quaternary ammonium compound, an antimicrobial amine, and an anionic scale inhibitor. Beneficially, the compositions provide sanitizing efficacy without diminished performance and without scale formation when diluted with hard water. The compositions are suitable for inactivating and/or reducing infectious agents, particularly Norovirus, Adenovirus, and Polyomavirus.

34 Claims, 13 Drawing Sheets

QUATERNARY DISINFECTANT COMPOSITION WITH ANIONIC SCALE INHIBITING AGENT

CROSS-REFERENCE TO RELATED APPLICATIONS

This is a Continuation Application of nonprovisional U.S. application Ser. No. 15/171,828, filed Jun. 2, 2016, which is herein incorporated by reference in its entirety.

FIELD OF THE INVENTION

The present invention relates to quaternary amine disinfectant cleaning compositions containing anionic scale inhibiting agents. In particular, the present invention relates to anionic scale inhibitor compositions that can be used at low concentrations in quaternary amine based formulations without causing formulation incapability or comprised efficacy while avoiding scale formation. The compositions of the present invention can be used for cleaning and disinfecting surfaces in one step combining antimicrobial efficacy with short contact times.

BACKGROUND OF THE INVENTION

Microbes may often be present on many common objects and surfaces in everyday life. Microbes can include, for example, bacteria, fungi, spores, viruses, prions, microorganisms such as, e.g., *Mycobacterium tuberculosis, Listeria monocytogenas, Escherichia coli, Pseudomonas aeruginosa, Salmonella typhimurium, Salmonella enteritidis, Yersinia pestis, Staphylococcus aureus, Bacillus subtilis, Enterobacter aerogenes Streptococcus faecalis, Legionella pneumophila, Vibrio parahaemolyticus, Bacillus cereus*, and other gram positive and gram negative bacteria. Several such microbes/microorganisms, individually or in combination, can cause illness or other health problems, for example, when they come into contact with humans and/or animals, or when they are ingested along with food which has contacted them. These microbes present health hazards due to infection or contamination. When microorganisms are present on the surface of a substrate they can replicate rapidly to form colonies. The microbial colonies form a coating on the substrate surface which is known as a biofilm. Biofilms frequently consist of a number of different species of microorganisms which in turn can be more difficult to eradicate and thus more hazardous to health than individual microorganisms. Some microorganisms also produce polysaccharide coatings, which makes them more difficult to destroy. For example, hospitals and other medical facilities may have a particular need for sterile and/or uncontaminated surfaces, both in surgical and general medical areas as well as in convalescence facilities, where patient exposure may be significant and resistance to such microbes may be lowered.

Much time and effort can be spent, for example, on disinfecting and sterilizing medical instruments, testing devices, etc. Often, such devices can be provided with disposable components or covers (e.g., disposable thermometer probes) to avoid cross-contamination between patients. Disposable needles are also commonly used. Such disposable materials involve increased costs and increased waste, as well as potential safety issues associated with their disposal.

Quaternary ammonium chloride-containing products (also known as "quats") have been used in hard surface disinfection for many years. As a broad-spectrum disinfectant, they have acceptable efficacy against some organisms (e.g. *Staphylococcus aureus*), but often fall short in efficacy against mycobacteria and viruses. Thus, other harsher disinfectant or sporicidal products, such as Sodium chlorite (NaC102), ozone, H2O2 and peracetic acids are often used when mycobactericidal and virucidal efficacy is required.

Recently, a disinfecting cleaning composition was developed which comprises at least one quaternary ammonium chloride of N-alkyl dimethyl benzyl ammonium chloride and at least one bis(3-aminopropyl) alkylamine (WO 2015/078496). This cleaning composition is material non-destructive and has a rapid and high level of tuberculocidal and mycobactericidal efficacy and a rapid and high level of efficacy against Norovirus, Adenovirus and Polyomavirus. However, there is a need for such cleaners to be used with hard water to form clear, diluted use solutions without forming hard water scale.

BRIEF SUMMARY OF THE INVENTION

The present invention is directed to a disinfectant cleaner composition comprising:
a) at least one biocidal quaternary ammonium compound;
b) at least one antimicrobial amine; and
c) an anionic scale inhibitor.

Applicants have identified scale inhibiting agents which are effective for preventing scale build up in quaternary based disinfectant compositions without comprising efficacy. The compositions of the invention utilize new anionic scale inhibitors that allow for the production of effective use solutions that remain clear even when hard water is utilized.

According to the invention, the ratio of biocidal quaternary ammonium to antimicrobial amine is in the range of about 0.1:1 to about 1:1. This ratio has been shown to be material non-destructive, with a rapid and high level of tuberculocidal and mycobactericidal efficacy and/or a rapid and high level of efficacy against Norovirus, Adenovirus, and Polyomavirus. According to the invention, an anionic scale inhibitor is added in a small but effective amount, to avoid instability of the composition or precipitation of the scale inhibitor. Typically the amount of anionic scale inhibitor is from about 0.001 wt-% to about 10 wt-% for effective scale inhibition without any deleterious effect on disinfecting activity. The invention may also include phenoxy alkanols, corrosion inhibitors, surfactants, chelants, solvents, and the like.

The disinfectant cleaner composition of the invention can be used for inactivating and/or reducing infectious agents, comprising bacteria, virus, and/or yeasts, on hard and/or soft surfaces, preferably for inactivating tuberculosis causing organism or other pathogens from the group of mycobacteria.

In particular, the disinfectant cleaner composition of the invention can be used for activating and/or reducing virus on hard and/or soft surfaces, preferably for inactivating and/or reducing Adenovirus and/or Norovirus and/or viruses of the Polyomavirus and/or Papillomavirus-group. Additionally, the cleaner composition may be diluted with hard water to form a use solution which remains clear and does not form hard water scale when used.

Figure 1:
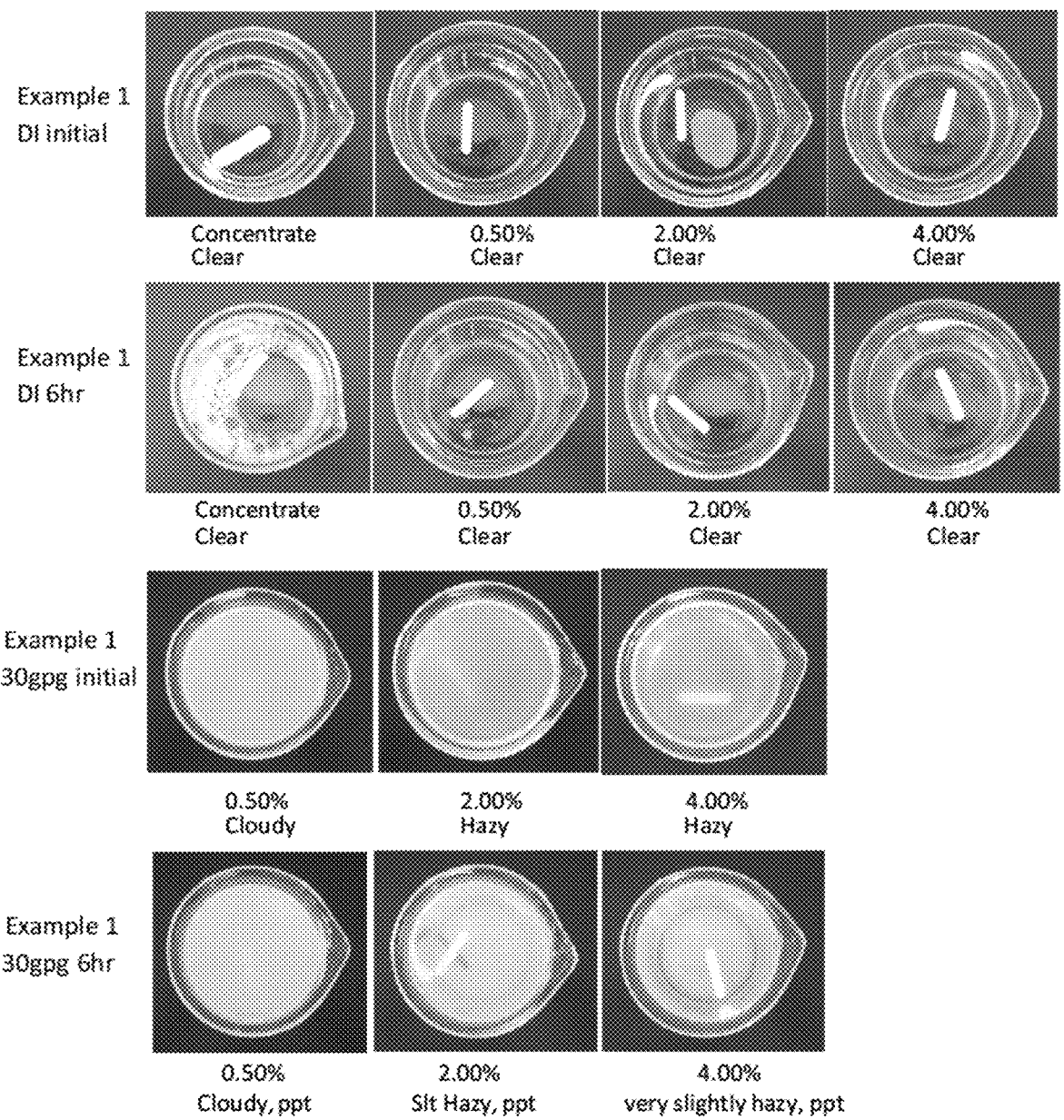
FIG. 1 shows the cleaning composition of example 1 diluted with deionized water (DI) after initial stirring and after 6 hours and then diluted with hard water (30 gpg) after initial stirring and after 6 hours.
Figure 2:
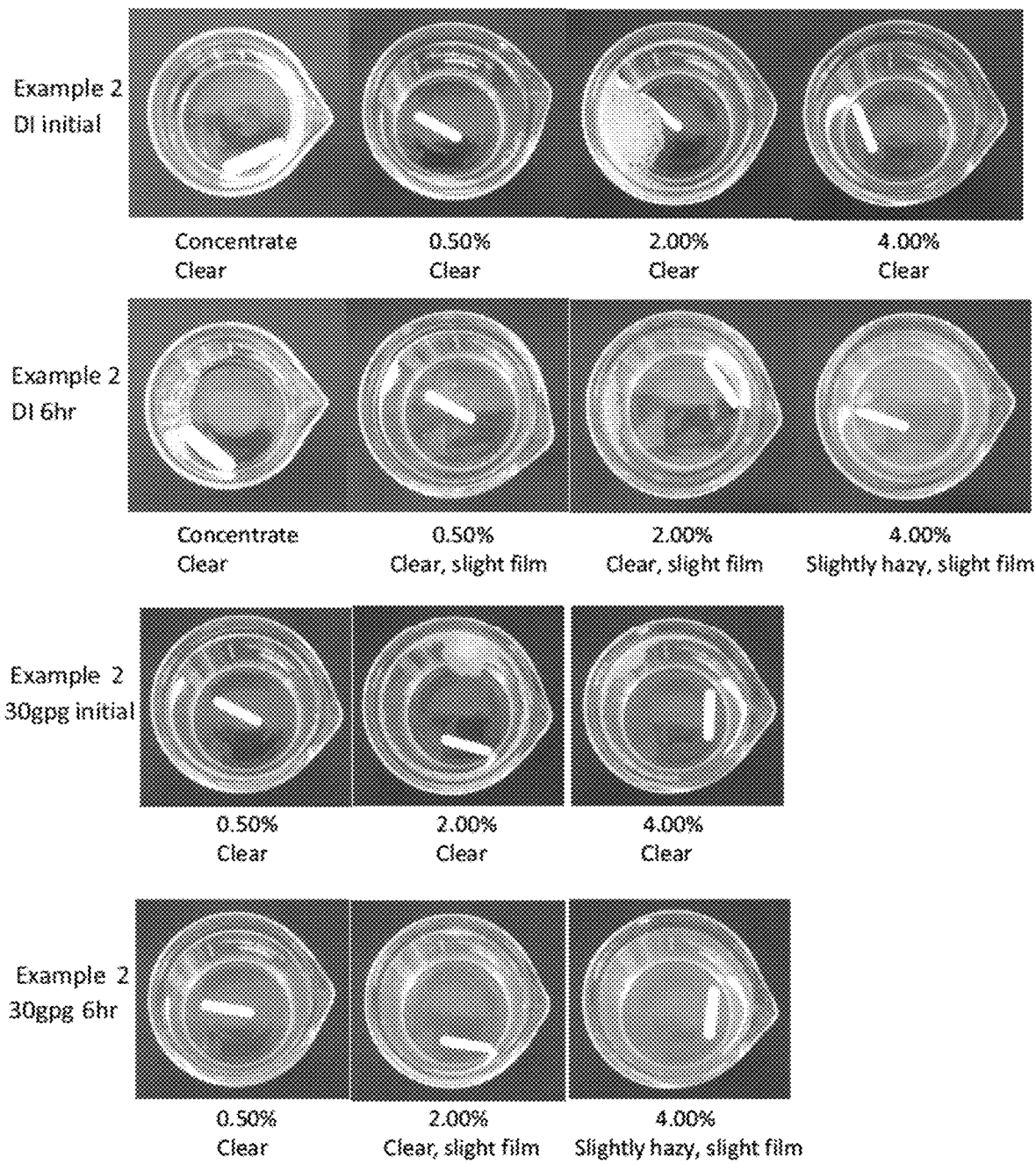
FIG. 2 shows the cleaning composition of example 2 diluted with deionized water (DI) after initial stirring and after 6 hours and then diluted with hard water (30 gpg) after initial stirring and after 6 hours.
Figure 3:
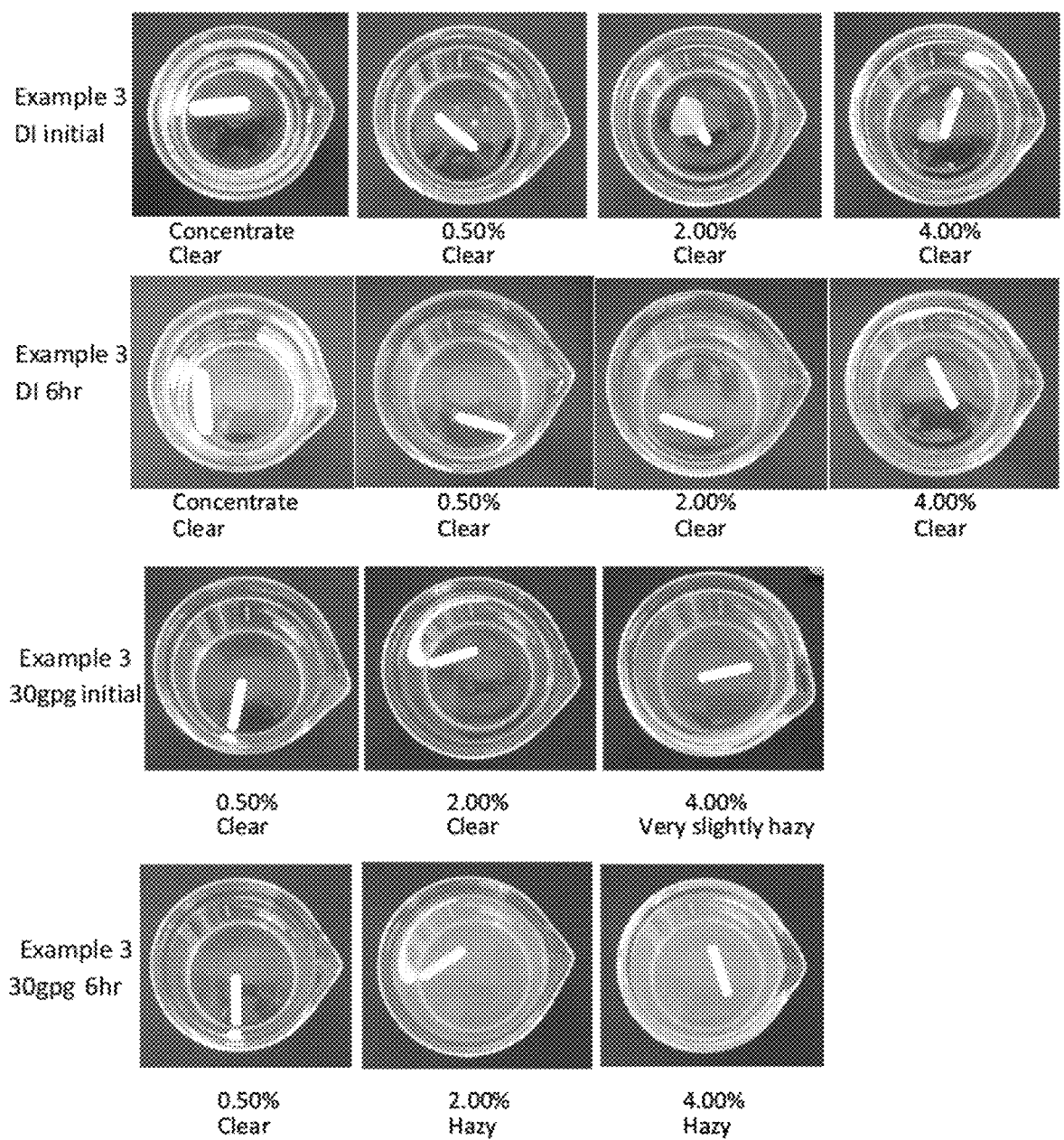
FIG. 3 shows the cleaning composition of example 3 diluted with deionized water (DI) after initial stirring and after 6 hours and then diluted with hard water (30 gpg) after initial stirring and after 6 hours.
Figure 4:
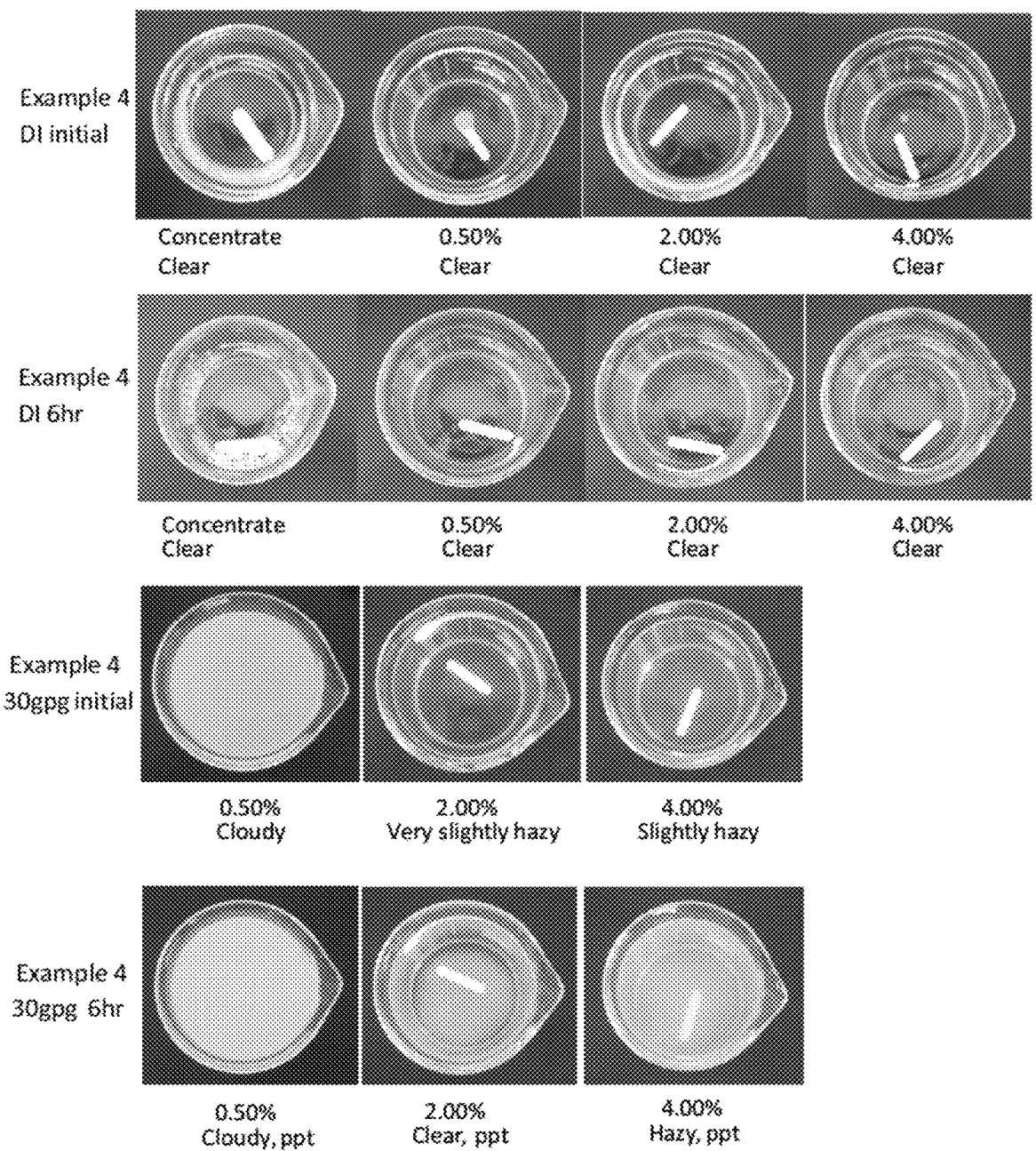
FIG. 4 shows the cleaning composition of example 4 diluted with deionized water (DI) after initial stirring and after 6 hours and then diluted with hard water (30 gpg) after initial stirring and after 6 hours.
Figure 5:
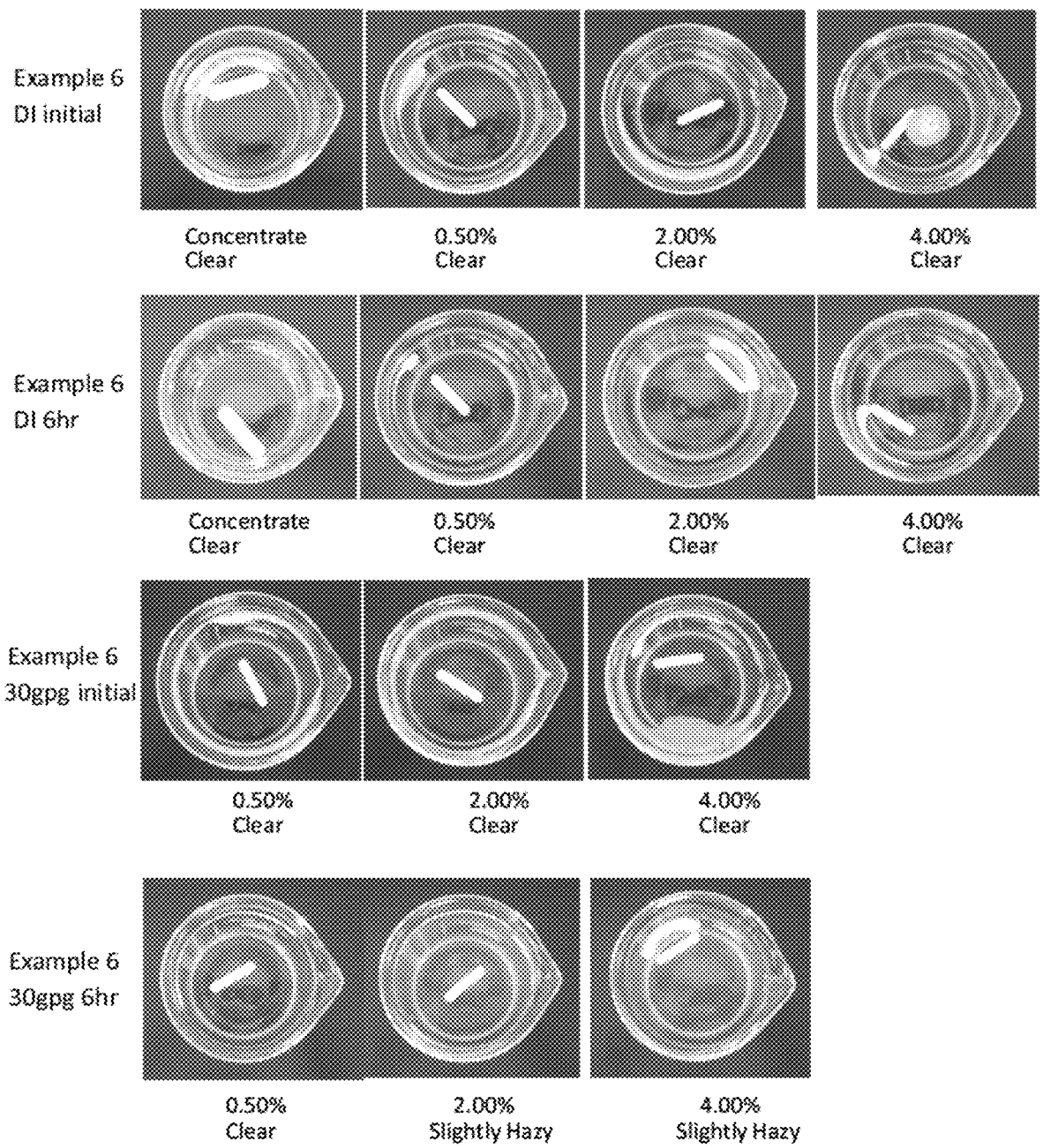
FIG. 5 shows the cleaning composition of example 6 diluted with deionized water (DI) after initial stirring and after 6 hours and then diluted with hard water (30 gpg) after initial stirring and after 6 hours.
Figure 6:
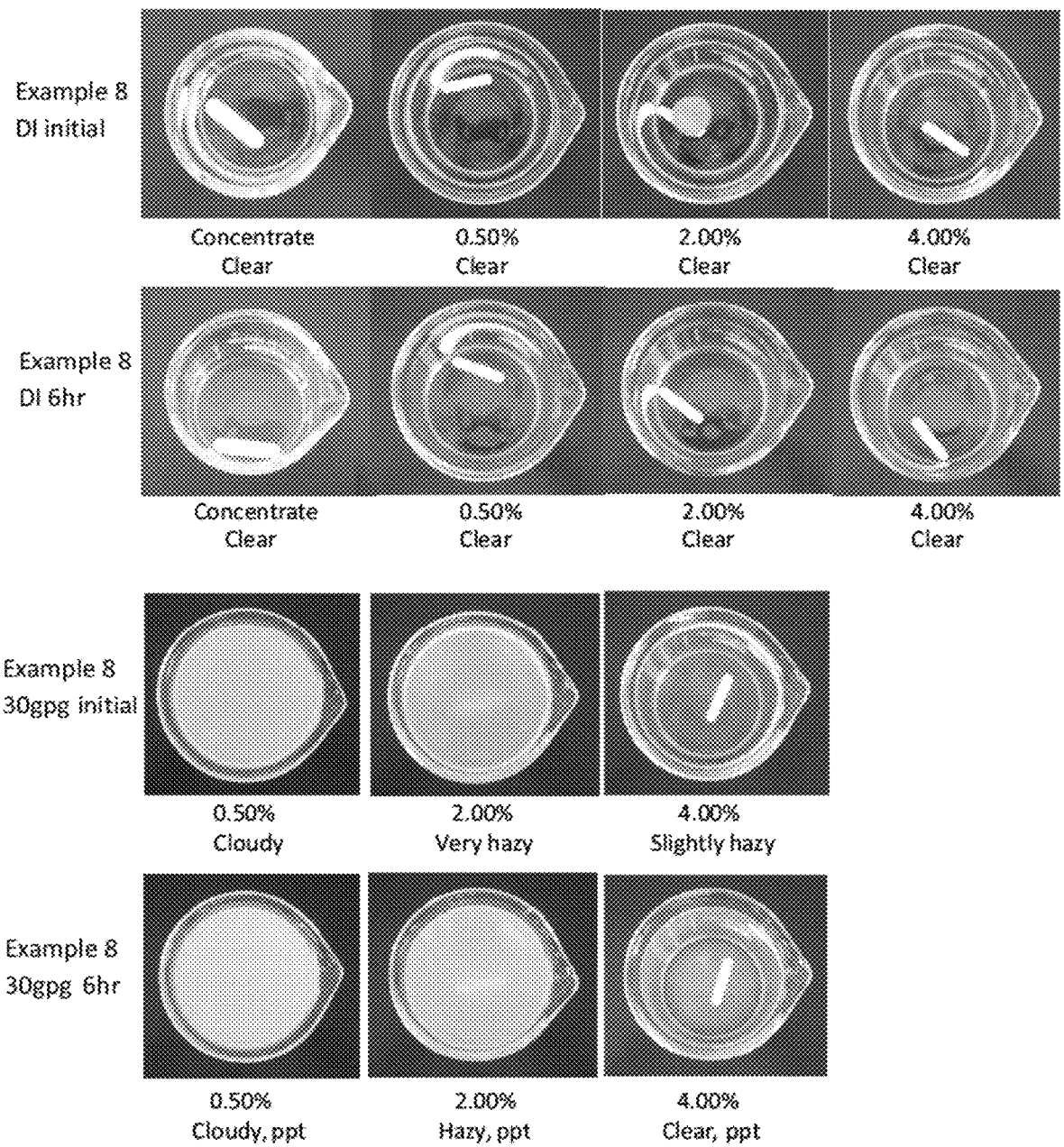
FIG. 6 shows the cleaning composition of example 8 diluted with deionized water (DI) after initial stirring and after 6 hours and then diluted with hard water (30 gpg) after initial stirring and after 6 hours.
Figure 7:
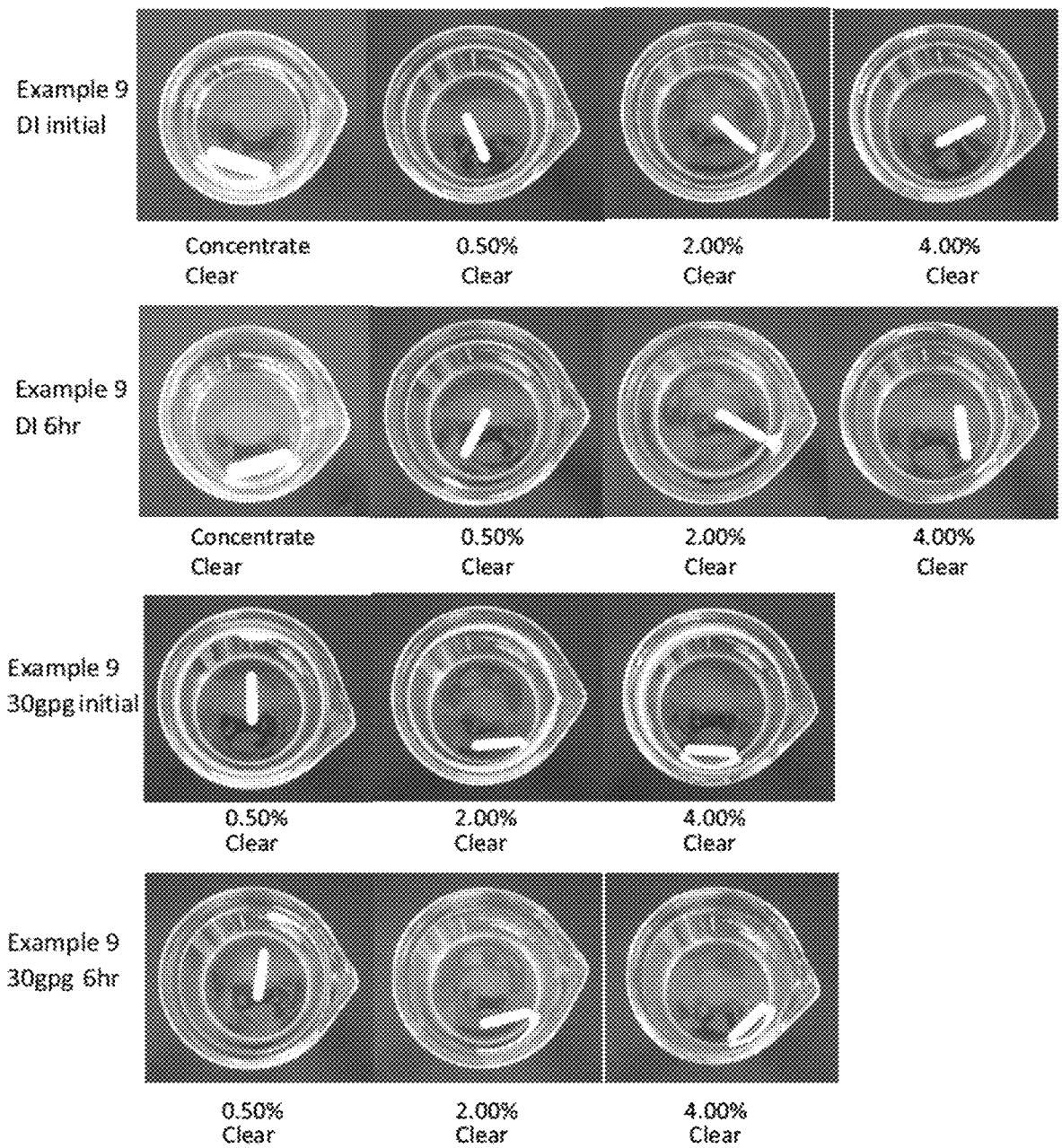
FIG. 7 shows the cleaning composition of example 9 diluted with deionized water (DI) after initial stirring and after 6 hours and then diluted with hard water (30 gpg) after initial stirring and after 6 hours.
Figure 8:
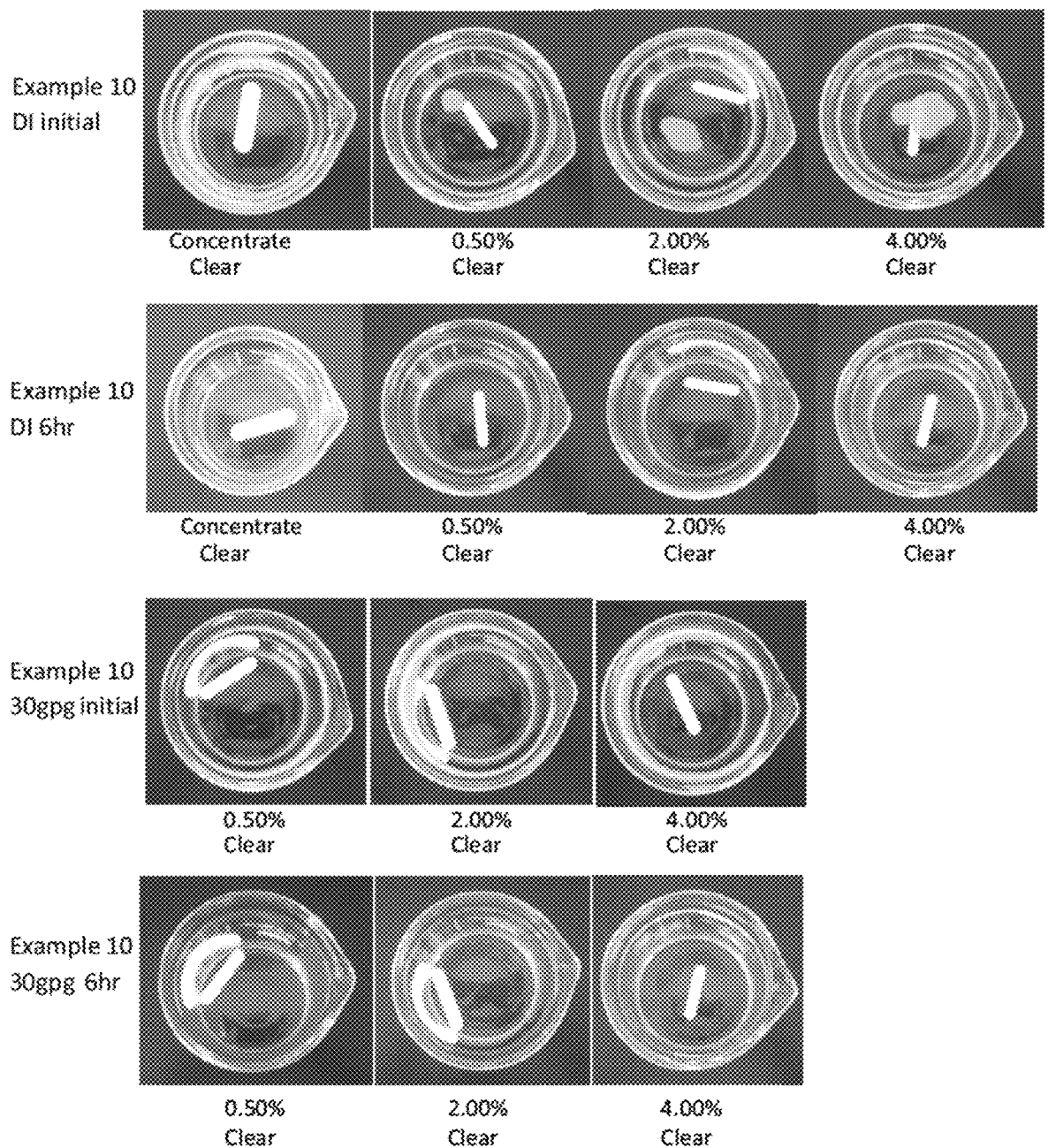
FIG. 8 shows the cleaning composition of example 10 diluted with deionized water (DI) after initial stirring and after 6 hours and then diluted with hard water (30 gpg) after initial stirring and after 6 hours.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

According to the invention, Applicant has identified specific amino-phosphonate scale inhibitors which may be added to quaternary ammonium chloride and antimicrobial amine based disinfectant compositions, which can effectively reduce scaling with no deleterious impact on activity. The invention provides for use solutions to be created with hard water that will prevent water scale formation and precipitation when the composition is diluted.

It is to be understood that all terminology used herein is for the purpose of describing particular embodiments only, and is not intended to be limiting in any manner or scope. For example, as used in this specification and the appended claims, the singular forms "a," "an," and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range. So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

As used herein, weight percent "wt-%," "percent by weight," "% by weight," and variations thereof refer to a composition, component, substance or agent as the weight of that composition, component, substance or agent of the disinfectant cleaner composition divided by the total weight of the disinfectant cleaner composition or use composition and multiplied by 100. It is understood that the total weight percent amount of all components, substances or agents of the disinfectant cleaner composition as well as use composition are selected such that it does not exceed 100 wt.-%.

It is understood that, as used here, "percent," "%", and the like are intended to be synonymous with "weight percent," "wt-%," etc.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

As used herein, the term "hard surface" includes showers, sinks, toilets, bathtubs, countertops, windows, mirrors, transportation vehicles, floors, and the like. These surfaces can be those typified as "hard surfaces" (such as walls, floors, bed-pans, etc.) or fabric surfaces, e.g., knit, woven, and non-woven surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmary, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the various medical or dental instruments or devices that can benefit from cleaning with a composition according to the present invention. As used herein, the phrases "medical instrument," "dental instrument," "medical device," "dental device," "medical equipment," or "dental equipment" refer to instruments, devices, tools, appliances, apparatus, and equipment used in medicine or dentistry. Such instruments, devices, and equipment can be cold sterilized, soaked or washed and then heat sterilized, or otherwise benefit from cleaning in a composition of the present invention. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressors, trocars, dilators, cages, glassware, tubing, catheters, cannulas, plugs, stents, scopes (e.g., endoscopes, stethoscopes, and arthoscopes) and related equipment, and the like, or combinations thereof.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "sanitizer" refers to an agent that reduces the number of bacterial contaminants to safe levels as judged by public health requirements. In an embodiment, sanitizers for use in this invention will provide at least a 99.9% reduction (3-log order reduction). In an aspect, sanitizers according to the invention provide at least a 99.9% reduction (3-log order reduction) within 30 seconds at room temperature. These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). The term "solvent" refers to an organic material or mixture of such materials suitable for cleaning, degreasing or stripping the desired surface, coupling, coalescing or adjusting viscosity.

As used in this invention, the term "sporicide" refers to a physical or chemical agent or process having the ability to cause greater than a 90% reduction (1-log order reduction) in the population of spores of *Bacillus cereus* or *Bacillus subtilis* within 10 seconds at 60° C. In certain embodiments, the sporicidal compositions of the invention provide greater than a 99% reduction (2-log order reduction), greater than a 99.99% reduction (4-log order reduction), or greater than a 99.999% reduction (5-log order reduction) in such population within 10 seconds at 60° C.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition The term "surfactant" or "surface active agent" refers to an organic chemical that when added to a liquid changes the properties of that liquid at a surface. In comparison, as used herein, the term "solfactant" refers to an organic chemical that when added to a liquid changes the properties of that liquid at a surface, specifically including the adjustment of the viscosity of a composition (e.g. handle ability or ease of use of the compositions). In particular, solfactant refers to a compound having the beneficial properties of both a surfactant and a solvent.

It should be noted that, as used in this specification and the appended claims, the term "N-dodecyl dimethyl benzyl ammonium chloride" stands for N-dodecyl dimethyl benzyl ammonium chloride or a mixture of quaternary ammonium chloride comprising N-alkyl dimethyl benzyl ammonium with C 12 to CI 8 alkyl containing N-dodecyl dimethyl benzyl ammonium chloride as the main component of at least about 50% wt.-%, based on the total amount of N-alkyl dimethyl benzyl ammonium with C12 to C18 alkyl.

The methods and compositions of the present invention may comprise, consist essentially of, or consist of the components/ingredients and steps set forth for the present invention as well as other ingredients and/or production steps described herein. As used herein, "consisting essentially of" means that the methods and compositions may include additional steps, components or ingredients, but only if the additional steps, components or ingredients do not materially alter the basic and novel characteristics of the claimed methods and compositions.

Disinfectant Composition

According to one embodiment of the invention, the disinfectant cleaner composition may comprise:
a) at least one biocidal quaternary ammonium compound;
b) at least one antimicrobial amine; and
c) an anionic scale inhibitor.

Biocidal Quaternary Ammonium Compounds

The disinfectant cleaner composition of the invention may comprise at least one biocidal quaternary ammonium compound. The biocidal quaternary ammonium compound is useful as a disinfectant. Quaternary ammonium compounds, also known as "quats", typically comprise at least one quaternary ammonium cation with an appropriate anion. The quaternary ammonium cations are permanently charged, independent of the pH of their solution.

The structure of the cation can be represented as follows:

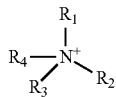

The groups $R_1$, $R_2$, $R_3$ and $R_4$ can vary within wide limits and examples of quaternary ammonium compounds that have anti-microbial properties will be well known to the person of ordinary skill in the art.

Each group $R_1$, $R_2$, $R_3$ and $R_4$ may, for example, independently be a substituted or unsubstituted and/or straight chain or branched and/or interrupted or uninterrupted alkyl, aryl, alkylaryl, arylalkyl, cycloalkyl, (aromatic or non-aromatic) heterocyclyl or alkenyl group. Alternatively, two or more of $R_1$, $R_2$, $R_3$ and $R_4$ may together with the nitrogen atom form a substituted or unsubstituted heterocyclic ring. The total number of carbon atoms in the groups $R_1$, $R_2$, $R_3$ and $R_4$ must be at least 4. Typically the sum of the carbon atoms in the groups $R_1$, $R_2$, $R_3$ and $R_4$ is 10 or more. In a preferred aspect of the invention at least one of the groups $R_1$, $R_2$, $R_3$ and $R_4$ contains from 8 to 18 carbon atoms. For example, 1, 2, 3 or 4 of $R_1$, $R_2$, $R_3$ and $R_4$ can contain from 8 to 18 carbon atoms or 10 to 16 carbon atoms.

Suitable substituents for the groups R-i, $R_2$, $R_3$ and $R_4$ may be selected from the group consisting of alkyl, substituted alkyl, alkenyl, substituted alkenyl, heterocyclyl, substituted heterocyclyl, cycloalkyl, substituted cycloalkyl, aryl, substituted aryl, alkylaryl, substituted alkylaryl, arylalkyl, substituted arylalkyl. F, Cl, Br, I, —$OR^1$, —$NR^1R''$, —$CF_3$, —CN, —$NO_2$, —$C_2R^1$, —SR', —$N_3$, —C(=O)NR'R'', —$NR^1C(O)R''$, —C(=O)R\—C(=O)OR\—OC(O)R$^1$, —O($CR^1R''$),C(=O)R', O(CR'R''),NR''C(O)R', —O(CR'R''),NR''SO$_2$R', —OC(O)NR$^1$R'', —$NR^1C(O)OR''$, —SO$_2$R', —SO$_2$NR$^1$R'', and —NR$^1$SO$_2$R'', wherein $R^1$ and R'' are individually hydrogen, $C_1$-$C_8$ alkyl, cycloalkyl, heterocyclyl, aryl, or arylalkyl, and r is an integer from 1 to 6, or R' and R'' together form a cyclic functionality, wherein the term "substituted" as applied to alkyl, alkenyl, heterocyclyl, cycloalkyl, aryl, alkylaryl and arylalkyl refers to the substituents described above, starting with F and ending with —NR$^1$SO$_2$R''.

When one or more of $R_1$, $R_2$, $R_3$ and $R_4$ is interrupted, suitable interrupting groups include but are not limited to heteroatoms such as oxygen, nitrogen, sulphur, and phosphorus-containing moieties (e.g. phosphinate) A preferred interrupting group is oxygen.

Suitable anions for the quats include but are not limited to halide anions such as chloride, fluoride, bromide or iodide and the non-halide sulphonate.

Preferred quats are those having the formula: $(CH_3)_n(A)_mN^+X$— wherein A may be as defined above in relation to $R_1$, $R_2$, $R_3$ and $R_4$. X'' is selected from chloride, fluoride, bromide or iodide and sulphonate (preferably chloride or bromide), n is from 1 to 3 (preferably 2 or 3) and m is from 1 to 3 (preferably 1 or 2) provided that the sum of n and m is 4. Preferably, A is a $C_{6-20}$ (e.g. $C_{8-18}$, i.e. having 8, 9, 10, 11, 12, 13, 14, 15, 16, 17 or 18 carbon atoms or $C_{8-12}$ or $C_{12-18}$) substituted or unsubstituted and/or straight chain or branched and/or interrupted or uninterrupted alkyl, aryl, alkylaryl, arylalkyl or cycloalkyl group (wherein suitable substituents are as defined above in relation to $R_1$, $R_2$, $R_3$ and $R_4$). Each group A may be the same or different.

A preferred group of the compounds of formula $(CH_3)_n(A)_mN^+X'$ are those wherein n=3 and m=1. In such compounds A may be as defined above and is preferably a $C_{6-20}$ substituted or unsubstituted and/or straight chain or branched and/or interrupted or uninterrupted alkyl, aryl, or alkylaryl group. Examples of this type of quaternary ammonium compound include Cetrimide (which is predominately trimethyltetradecylammonium bromide), dodecyltrimethylammonium bromide, trimethyltetradecylammonium bromide, hexadecyltrimethylammonium bromide.

Another preferred group of the compounds of formula $(CH_3)_n(A)_mN^+X'$ are those wherein n=2 and m=2. In such compounds A may be as defined above in relation to $R_1$, $R_2$, $R_3$ and $R_4$. Preferably A is a $C_{6-20}$ substituted or unsubstituted and/or straight chain or branched and/or interrupted or uninterrupted alkyl, aryl, or alkylaryl group. For example, A may represent a straight chain, unsubstituted and uninterrupted $C_{8-12}$ alkyl group or a benzyl group. In these compounds, the groups A may be the same or different. Examples of this type of compound include didecyl dimethyl ammonium chloride and dioctyl dimethyl ammonium chloride.

Examples of the preferred quaternary ammonium compounds described above include the group of compounds which are generally called benzalkonium halides and aryl ring substituted derivatives thereof. Examples of compounds of this type include benzalkonium chloride, which has the structural formula:

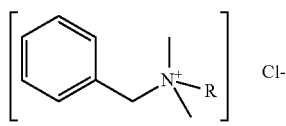

wherein R may be as defined above in relation to $R_1$, $R_2$, $R_3$ and $R_4$. Preferably, R is a $C_{8-18}$ alkyl group or the benzalkonium chloride is provided and/or used as a mixture of $C_8$—is alkyl groups, particularly a mixture of straight chain, unsubstituted and uninterrupted alkyl groups n-$C_8H_{17}$ to n-$C_{18}H_37$, e.g. n-$C_{12}H_{25}$ to n $C_{18}H_{37}$ mainly n-$C_{12}H_{28}$ (dodecyl), n-$C_{14}H_{29}$ (tetradecyl), and n-$C_{16}H_{33}$ (hexadecyl).

Other preferred quaternary ammonium compounds include those in which the benzene ring is substituted, for example alkyldimethyl ethylbenzyl ammonium chloride. As an example, a mixture containing, for example, equal molar amounts of alkyl dimethyl benzyl ammonium chloride and alkyldimethyl ethylbenzyl ammonium chloride may be used.

Other quaternary ammonium compounds suitable for use in the invention include, but are not limited to, alkylpyridinium compounds, such as cetylpyridinium chloride, and bridged cyclic amino compounds such as the hexaminium compounds.

Preferably, the biocidal quaternary ammonium compound is a quaternary ammonium chloride of N-alkyl dimethyl benzyl ammonium chloride. The N-alkyl dimethyl benzyl ammonium chloride, wherein said alkyl has from about 8 to about 18 carbon atoms, also known as benzalkonium chloride and ADBAC, is a cationic surface-acting agent belonging to the quaternary ammonium group. It has three main categories of use: as a biocide, a cationic surfactant, and phase transfer agent in the chemical industry.

The least one quaternary ammonium chloride can be: at least one N-alkyl dimethyl benzyl ammonium chloride, wherein said alkyl has from about 8 to about 18 carbon atoms, can be selected from the group of at least one alkyl(C14) dimethyl benzyl ammonium chloride, alkyl(C16) dimethyl benzyl ammonium chloride, alkyl(C18) dimethyl benzyl ammonium chloride, a mixture of N-alkyl(C8-C18) dimethyl benzyl ammonium chloride, or a mixture of N-alkyl(C10-C18) dimethyl benzyl ammonium chloride, or any combination thereof; and more preferred a N-alkyl(C10-C18) dimethyl benzyl ammonium chloride mixture, further preferred dodecyl dimethyl benzyl ammonium chloride and most preferred a N-alkyl(C10-C18) dimethyl benzyl ammonium chloride mixture. An exemplary N-alkyl(C10-C18) dimethyl benzyl ammonium chloride mixture is Barquat DM-50, produced by Lonza (Basel, Switzerland).

A disinfectant cleaner composition of the invention, preferably in form of a concentrate, may comprise about 1 wt.-% to about 30 wt.-%, preferably about 2 wt.-% to about 24 wt.-%, more preferred about 3 wt.-% to about 18 wt.-%, and most preferred of about 4 wt.-% to about 11 wt.-% of a biocidal quaternary ammonium compound, preferably a quaternary ammonium chloride of N-alkyl dimethyl benzyl ammonium chloride, more preferably a N-alkyl(C10-C18) dimethyl benzyl ammonium chloride mixture; based on the total weight amount of the disinfectant cleaner composition of the invention, preferably in form of a concentrate.

A diluted disinfectant cleaner composition of the invention may comprise about 0.0001 wt.-% to about 3 wt.-%, preferably about 0.0005 wt.-% to about 2 wt.-%, more preferred about 0.001 wt.-% to about 1 wt.-%, and most preferred of about 0.005 wt.-% to about 0.5 wt.-% of a biocidal quaternary ammonium compound, preferably a quaternary ammonium chloride of N-alkyl dimethyl benzyl ammonium chloride, more preferably a N-alkyl(C10-C18) dimethyl benzyl ammonium chloride mixture; based on the total weight amount of the diluted disinfectant cleaner composition of the invention.

Antimicrobial Amine

The disinfectant cleaner composition of the invention may comprise at least one antimicrobial amine. The amine may be a primary, secondary, or tertiary amine. Exemplary antimicrobial amines are listed below:

Aliphatic amine salts such as: ether ammonium salts.
Diamines such as: N-coco-1,3-propylene diamine (such as Duomeen®—Akzo Chemie America, Armak Chemicals), N-oleyl-1,3-propylene diamine (such as Duomeen®—Akzo Chemie America, Armak Chemicals), N-tallow-1,3-propylene diamine (such as Duomeen®—Akzo Chemie America, Armak Chemicals) Diamine salts such as: diamine acetate (or other counterion), or
diamine sales with the formulas $[(R_1)NH(R_2)NH_3]^+ (CH_3COO)^-$ or $[R_1)NH_2(R_2)NH_3^{++}](CH_3COO)_2^-$ where
$R_1$=a $C_{10}$-$C_{18}$ aliphatic group or an ether group having the formula $R_{10}OR_{11}$ where $R_{10}$=a $C_{10}$-$C_{18}$ aliphatic group and $R_{11}$=a $C_1$-$C_5$ alkyl group; and
$R_2$=a $C_1$-$C_5$ alkylene group, or
$R_1$=a $C_{10}$-$C_{18}$ aliphatic group derived from a fatty acid, and
$R_2$=propylene Preferably, the antimicrobial amine is a secondary or tertiary alkyl amine having the general formula:

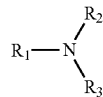

wherein $R_1$ is a $C_4$-$C_{20}$—, particularly $C_6$-$C_{18}$-alkyl, $C_5$-$C_{10}$—, particularly $C_6$-cycloalkyl, $C_7$-$C_{10}$, in particular $C_7$-arylalkyl or $C_6$-$C_{14}$—, particularly $C_6$-aryl group, $R_2$ an aminoalkyl group of formula —$(CH_2)_n$—$NH_2$, where n is a number from 2 to 10, preferably 2 to 6 and particularly preferably 2 to 3, and $R_3$ is hydrogen or $R_2$ is.
Preferably, $R_1$ is a $C_6$-$C_{18}$-alkyl group, preferably a $C_{10}$-$C_{18}$- and particularly preferably a dodecyl. $R_2$ is preferably an aminopropyl group and $R_3$ is hydrogen or $R_2$. When $R_2$ and $R_3$ are the same, the tertiary amine is preferably N-(3-aminopropyl)-N-dodecyl-1,3-propanediamine and N, N-bis(3-aminopropyl) laurylamine.

The tertiary amine, which is preferably a bis(3-aminopropyl)alkylamine, is known to be effective against bacteria, yeasts and molds in low concentrations. The bis(3-aminopropyl) alkylamine, wherein said alkyl has from about 6 to about 18 carbon atoms, is not known to have antiviral efficacy against Norovirus, Adenovirus and/or Polyomavirus. Preferably the bis(3-aminopropyl) alkylamine comprises N-(3-aminopropyl)-N-dodecylpropane-1,3-diamene. An exemplary N-(3-aminopropyl)-N-dodecylpropane-1,3-diamene is commercially available from Lonza (Basel, Switzerland) under the name Lonzabac.

The bis(3-aminopropyl) alkylamine, wherein said alkyl has from about 6 to about 18 carbon atoms, may be selected from the group comprising a bis(3-aminopropyl) C6-C18-alkylamine, a bis(3-aminopropyl) octylamine, a bis(3-aminopropyl) decyl amine, a bis(3-aminopropyl) dodecylamine, a bis(3-aminopropyl) quatrodecylamine, a bis(3-aminopropyl) hexadecylamine, a bis(3-aminopropyl) octadecylamine, or any combination thereof, and most preferred is a bis(3-aminopropyl) dodecylamine.

A disinfectant cleaner composition of the invention, preferably in form of a concentrate, may comprise about 1 wt.-% to about 30 wt.-%, preferably about 2 wt.-% to about 24 wt.-%, more preferred about 3 wt.-% to about 18 wt.-%, and most preferred of about 4 wt.-% to about 12 wt.-% of at least one antimicrobial amine, preferably a tertiary alkyl amine, and more preferably a bis(3-aminopropyl) C8-C18 alkylamine; based on the total weight amount of the disinfectant cleaner composition of the invention, preferably in form of a concentrate.

A diluted disinfectant cleaner composition of the invention may comprise about 0.0005 wt.-% to about 3 wt.-%, preferably about 0.001 wt.-% to about 2 wt.-%, more preferred about 0.005 wt.-% to about 1 wt.-%, and most preferred of about 0.01 wt.-% to about 0.5 wt.-% at least one antimicrobial amine, preferably a tertiary alkyl amine, and more preferably a bis(3-aminopropyl) C8-C18 alkylamine; based on the total weight amount of the diluted disinfectant cleaner composition of the invention.

Anionic Scale Inhibitor

The disinfectant cleaner composition of the invention may comprise at least one anionic scale inhibitor. A scale inhibitor, forms soluble, complex molecules with certain metal ions, inactivating the ions so that they cannot normally react with other elements or ions to produce precipitates.

Suitable scale inhibitors can be selected from the group consisting of amino carboxylates, amino phosphonates, polyfunctionally-substituted aromatic chelating agents and mixtures thereof. Preferred scale inhibitors for use herein are amino phosphonates. Amino phosphonates include ethylenediaminetetrakis(methylenephosphonates) such as DEQUEST. Preferred, these amino phosphonates that do not contain alkyl or alkenyl groups with more than about 6 carbon atoms.

Preferably, the scale inhibitor is an ethanolamine-N,N-bis(methylene phosphonate). More preferably, the ethanolamine-N,N-bis(methylene phosphonate) has the formula:

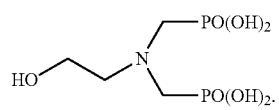

An exemplary ethanolamine-N,N-bis(methylene phosphonate) is commercially available under the name SI 2670 from Nalco-Champion (Sugar Land, Tex.) or Briquest 221-50A from Solvay (Brussels, Belgium).

A disinfectant cleaner composition of the invention, preferably in form of a concentrate, may comprise about 0.001 wt.-% to about 10 wt.-%, preferably about 0.005 wt.-% to about 8 wt.-%, more preferred about 0.01 wt.-% to about 5 wt.-%, and most preferred of about 0.05 wt.-% to about 2 wt.-% of an anionic scale inhibitor, preferably amino phosphonate, more preferably an ethanolamine-N,N-bis(methylene phosphonate); based on the total weight amount of the disinfectant cleaner composition of the invention, preferably in form of a concentrate.

A diluted disinfectant cleaner composition of the invention may comprise about 0.000005 wt.-% to about 2 wt.-%, preferably about 0.00001 wt.-% to about 1 wt.-%, more preferred about 0.00005 wt.-% to about 0.5 wt.-%, and most preferred of about 0.0001 wt.-% to about 0.1 wt-% of an anionic scale inhibitor, preferably amino phosphonate, more preferably an ethanolamine-N,N-bis(methylene phosphonate); based on the total weight amount of the disinfectant cleaner composition of the invention.

Aromatic Alcohol

The disinfectant cleaner composition of the invention may comprise at least one aromatic alcohol. The aromatic alcohol is preferably a phenoxy alkanol, a phenyl monoglycol ether of an oligoglycol with up to 20 ethylene oxide units or a phenyl alkanol, in which the phenyl ring can be substituted in each case. $C_1$-$C_{18}$ alkyl groups in particular come into consideration as substituents. It is preferred if the aromatic alcohol is 2-phenoxy ethanol, 1-phenoxy-2-propanol, 2-phenoxy-1-propanol, 3-phenoxy-1-propanol, 1-phenoxy-2-butanol, 2-phenoxy-1-butanol, 1-phenyl ethyl alcohol, 2-phenyl ethyl alcohol, 3-phenyl-1-propanol, benzyl alcohol, a,4-dimethyl benzyl alcohol or a mixture of two or more of these compounds.

The aromatic alcohol is preferably a phenoxy alkanol. The phenoxy alkanol, wherein the alkanol has from about 1 to about 6 carbon atoms, is known to be used in many applications such as cosmetics, vaccines and pharmaceuticals as a preservative. Phenoxy alkanol is not known to have antiviral efficacy against Norovirus, Adenovirus and/or Polyomavirus.

The phenoxy alkanol can be selected from the group comprising at least one phenoxy alkanol, wherein the alkanol has from about 1 to about 6 carbon atoms, preferably 2 to 4 or 3 carbon atoms, or any combination thereof, and most preferred the phenoxy alkanol is a phenoxy ethanol.

A disinfectant cleaner composition of the invention, preferably in form of a concentrate, may comprise about 0 wt.-% to about 40 wt.-%, preferably about 0 wt.-% to about 25 wt.-%, more preferred about 1 wt.-% to about 19 wt.-%, and most preferred of about 5 wt.-% to about 15 wt.-% of at least one aromatic alcohol, preferably a phenoxy alkanol, wherein the alkanol has from about 1 to about 6 carbon atoms or any combination thereof, and most preferred phenoxy ethanol; based on the total weight amount of the disinfectant cleaner composition of the invention, preferably in form of a concentrate.

A diluted disinfectant cleaner composition of the invention may comprise about 0 wt.-% to about 5 wt.-%, preferably about 0.0001 wt.-% to about 3 wt.-%, more preferred about 0.001 wt.-% to about 2 wt.-%, and most preferred of about 0.01 wt.-% to about 1 wt.-% of at least one aromatic alcohol, preferably a phenoxy alkanol, wherein the alkanol has from about 1 to about 6 carbon atoms or any combination thereof, and most preferred phenoxy ethanol; based on the total weight amount of the diluted disinfectant cleaner composition of the invention.

It should be understood that the disinfectant cleaner composition of the invention can be preferably free of an aromatic alcohol.

Corrosion Inhibitor

According to the present invention, at least one corrosion inhibitor maybe used to prevent the corrosion of an article to be cleaned.

Preferably a silicate(s) corrosion inhibitor and more preferred a disilicate corrosion inhibitor can be used in the disinfectant cleaner composition according to the present invention. The silicate(s) and/or disilicate corrosion inhibitor can be an alkali silicate and/or alkali disilicate.

Other inhibitors that can be used can be selected from the group comprising calcium acetate, calcium chloride, calcium gluconate, calcium phosphate, calcium borate, calcium carbonate, calcium citrate, calcium lactate, calcium sulfate, calcium tartrate, benzotriazole, 1,2,3-benzotriazole and mixtures thereof.

More preferred, the corrosion inhibitor is a heterocyclic compound, a triazole derivate, such as a benzotriazole or 1,2,3-benzotriazole and mixtures thereof.

However, other corrosion inhibitors can be suitable added to the disinfectant composition of this invention include magnesium and/or zinc ions and Ca (N02) 2. Preferably, the metal ions are provided in water-soluble form.

Examples of useful water-soluble forms of magnesium and zinc ions are the water-soluble salts thereof including the chlorides, nitrates and sulfates of the respective metals. If any of the alkalinity providing agents are the alkali metal carbonates, bicarbonates or mixtures of such agents, magnesium oxide can be used to provide the Mg ion. The magnesium oxide is water soluble and is a preferred source of Mg ions. In order to maintain the dispersibility of the magnesium and/or zinc corrosion inhibitors in aqueous solution, and in the presence of agents which would otherwise cause precipitation of the zinc or magnesium ions, e.g., carbonates, etc., it might be advantageous to include a carboxylated polymer to the solution.

The useful carboxylated polymer corrosion inhibitors may be generically categorized as water-soluble carboxylic acid polymers such as polyacrylic and polymethacrylic acids or vinyl addition polymers, in addition to the acid-substituted polymers used in the present invention.

Of the vinyl addition polymer corrosion inhibitors contemplated, maleic anhydride copolymers as with vinyl acetate, styrene, ethylene, isobutylene, acrylic acid and vinyl ethers are examples.

The polymers tend to be water-soluble or at least colloidally dispersible in water. The molecular weight of these polymers may vary over a broad range although it is preferred to use polymers having average molecular weights ranging between about 1,000 up to about 1,000,000. These polymers have a molecular weight of about 100,000 or less and between about 1,000 and about 10,000.

The polymers or copolymers (either the acid-substituted polymers or other added polymers) may be prepared by either addition or hydrolytic techniques. Thus, maleic anhydride copolymers are prepared by the addition polymerization of maleic anhydride and another comonomer such as styrene.

The low molecular weight acrylic acid polymer corrosion inhibitors may be prepared by addition polymerization of acrylic acid or its salts either with itself or other vinyl comonomers.

Alternatively, such polymers may be prepared by the alkaline hydrolysis of low molecular weight acrylonitrile homopolymers or copolymers.

According to a more preferred embodiment of the present invention the disinfectant cleaner composition may comprises of at least one corrosion inhibitor selected from the group comprising silicate, sodium silicate, sodium disilicate, calcium acetate, calcium chloride, calcium gluconate, calcium phosphate, calcium borate, calcium carbonate, calcium citrate, calcium lactate, calcium sulfate, calcium tartrate, benzotriazole, 1,2,3-benzotriazole, or any combination thereof, more preferred at least one benzotriazole, and most preferred at least one 1,2,3-benzotriazole.

According to the invention, the disinfectant composition, preferably in form of a concentrate, may comprise about 0 wt.-% to about 4 wt.-%, preferably about 0.001 wt.-% to about 2 wt.-%, more preferred about 0.01 wt.-% to about 1 wt.-%, and most preferred of about 0.1 wt.-% to about 0.5 wt.-% of at least one corrosion inhibitor, preferably benzotriazole, and most preferred at least one corrosion inhibitor, preferably benzotriazole, and most preferred 1,2,3-benzotriazole; based on the total weight amount of the disinfectant cleaner composition of the invention, preferably in form of a concentrate.

A diluted disinfectant cleaner composition of the invention may comprise about 0 wt.-% to about 1 wt.-%, preferably about 0.00001 wt.-% to about 0.5 wt.-%, more preferred about 0.00005 wt.-% to about 0.5 wt.-%, and most preferred of about 0.0001 wt.-% to about 0.5 wt.-% of at least one corrosion inhibitor, preferably benzotriazole, and most preferred 1,2,3-benzotriazole; based on the total weight amount of the diluted disinfectant cleaner composition of the invention.

It should be understood that the disinfectant cleaner composition of the invention can be preferably free of a corrosion inhibitor.

Surfactants

In some embodiments, the compositions of the present invention include a surfactant. Surfactants suitable for use with the compositions of the present invention include, but are not limited to, semi-polar nonionic surfactants such as amine oxides. In addition, other surfactants such as anionic surfactants, and zwitterionic surfactants may be used. In some embodiments, the compositions of the present invention include about 0.4 wt % to about 12.8 wt % of a surfactant. In some embodiments, the compositions of the present invention include about 62.5 ppm to about 2000 ppm of a surfactant.

Semi-Polar Nonionic Surfactants

The semi-polar type of nonionic surface active agents are the preferred class of surfactants useful in compositions of the present invention. Semi-polar nonionic surfactants include the amine oxides, phosphine oxides, sulfoxides and their alkoxylated derivatives. Most preferred are amine oxide surfactants of am $R^1$ chain length of 8.

Amine oxides are tertiary amine oxides corresponding to the general formula:

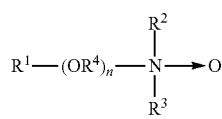

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide.

Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

The compositions of the invention may optionally include additional surfactants such as the following.

Nonionic Surfactants

Suitable additional nonionic surfactants for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 (R-(EO)$_5$(PO)$_4$) and Dehypon LS-36 (R-(EO)$_3$(PO)$_6$); and capped alcohol alkoxylates, such as Plurafac LF221 and Tegoten EC11; mixtures thereof, or the like.

Anionic Surfactants

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \qquad (3)$$

in which R is a $C_8$ to $C_{22}$ alkyl group or

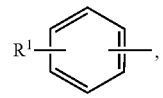

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_5$-$C_{16}$ alkyl group. In some embodiments, R is a $C_{12}$-$C_{14}$ alkyl group, n is 4, and m is 1.

In other embodiments, R is

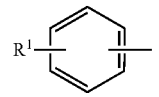

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12\text{-}13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989). The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

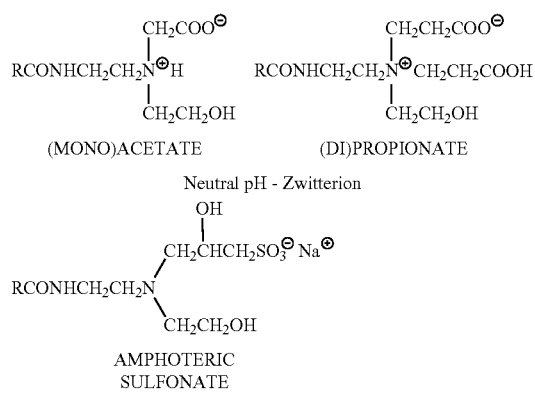

wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R=C_8-C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate. Betaine and sultaine surfactants are exemplary zwitterionic surfactants for use herein.

A general formula for these compounds is:

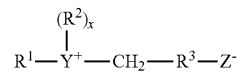

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

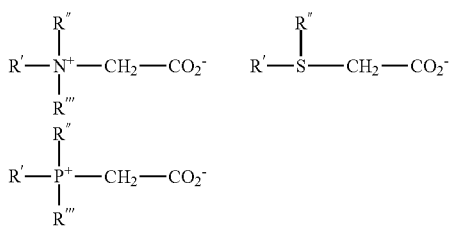

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch).

Solvents

The compositions of the invention may comprise one or more solvents. Suitable solvents include, but are not limited to, water, alcohols, ethanol, isopropanol, 2-butoxy ethanol, 1-decanol, benzyl alcohol, glycerin, monoethanolamine, glycols, ethylene glycol, diethylene glycol, propylene glycol, butoxy diglycol, triethylene glycol, tetraethylene glycol, glycerin, propylene glycol, dipropylene glycol, hexylene glycol, glycol ethers, esters, or combinations thereof. Suitable alcohols include, but are not limited to, ethanol, isopropanol, 2-butoxy ethanol, 1-decanol, benzyl alcohol, glycerin, monoethanolamine, or any combination thereof, and preferably the solvent is water.

According to the invention, the disinfectant composition, preferably in form of a concentrate, may comprises about 0 wt.-% to about 92 wt.-%, preferably about 20 wt.-% to about 80 wt.-%, more preferred about 50 wt.-% to about 75 wt.-%, and further more preferred about 55 wt.-% to about 70 wt.-%, preferably the solvent is added to 100 wt.-%, and most preferably the solvent is water; based on the total weight amount of the disinfectant cleaner composition of the invention, preferably in form of a concentrate.

A diluted disinfectant cleaner composition of the invention may comprise of at least one solvent of about 0 wt.-% to about 100 wt.-%, preferably about 0.05 wt.-% to about 99.5 wt.-%, more preferred about 0.05 wt.-% to about 99 wt.-%, and further more preferred about 0.07 wt.-% to about 99 wt.-%, preferably the solvent is added to 100 wt.-%, and most preferably the solvent is water; based on the total weight amount of the diluted disinfectant cleaner composition of the invention.

Alkaline Source

The source of alkalinity can be any source of alkalinity that is compatible with the other components of the disinfectant cleaner composition and that will provide the solution with the desired pH.

Exemplary sources of alkalinity include alkali metal hydroxides, alkali metal salts, amines, and mixtures thereof.

Exemplary alkali metal hydroxides include sodium hydroxide, potassium hydroxide, and lithium hydroxide.

Exemplary alkali metal salts include sodium carbonate, trisodium phosphate, potassium carbonate, and mixtures thereof.

Exemplary amines include alkanolamine selected from the group comprising triethanolamine, monoethanolamine, diethanolamine, and mixtures thereof.

The source of alkalinity, preferably an alkali metal hydroxide, may be added to the disinfectant cleaner composition in a variety of forms, including for example in the form of solid beads, dissolved in an aqueous solution or a combination thereof. Alkali metal hydroxides are commercially available as pellets or beads having a mix of particle sizes ranging from 12-100 U. S. mesh, or as an aqueous solution, as for example, as about 45 wt. %, about 50 wt. % and about 73 wt. % solution. Preferably the alkalinity source is selected from the group comprising alkali metal hydroxides, alkali metal salts, phosphates and/or amines and mixtures thereof, preferably triethanol amine, sodium hydroxide, potassium hydroxide, sodium carbonate, and/or sodium bicarbonate and mixtures thereof and more preferred ethanolamine.

According to the invention, the disinfectant composition, preferably in form of a concentrate, may comprises about 0 wt.-% to about 10 wt.-%, preferably about 0.1 wt.-% to about 8 wt.-%, more preferred about 0.5 wt.-% to about 5 wt.-%, and most preferred of about 1 wt.-% to about 3 wt.-% of at least one alkali source, and more preferred ethanolamine; based on the total weight amount of the disinfectant cleaner composition of the invention, preferably in form of a concentrate.

A diluted disinfectant cleaner composition of the invention may comprise about 0 wt.-% to about 0.5 wt.-%, preferably about 0.00025 wt.-% to about 0.4 wt.-%, more preferred about 0.001 wt.-% to about 0.2 wt.-%, and most preferred of about 0.004 wt.-% to about 0.1 wt.-% of at least one alkali source, and more preferred ethanolamine; based on the total weight amount of the diluted disinfectant cleaner composition of the invention.

It should be understood that the disinfectant cleaner composition of the invention can be preferably free of an alkali source.

It should be understood that the disinfectant cleaner composition of the invention can be preferably free of phosphates.

Sequestering Agent

The disinfectant cleaner composition may in addition comprises at least one sequestering agent selected from the group of sodium gluconate, pentasodium salt of diethylenetriamine pentaacetic acid (DTPA), sodium glucoheptonate, salts of ethylene diamine tetraacetic acid (EDTA), salts of ethylene diamine tetraacetic acid, salts of hydroxyethyl ethylene diamine triacetic acid, salts of hydroxyethyl ethylene diamine triacetic acid, salts of nitrilotriacetic acid, salts of nitrilotriacetic acid (NTA), diethanolglycine sodium salt, ethanoldiglycine disodium salt, salts of hydroxymonocarboxylic acid compounds, salts of hydroxydicarboxylic acid compounds, salts of amine containing carboxylic acids, terasodium N,N-bis(carboxylatomethyl)-L-glutamate (GLDA), hydroxyethylethylene-diaminetriacetate (HEDTA), or any combination thereof, and more preferred methylglycinediacetate (MGDA).

According to the invention, the disinfectant composition, preferably in form of a concentrate, may comprise about 0 wt.-% to about 20 wt.-%, preferably about 0.05 wt.-% to about 15 wt.-%, more preferred about 1 wt.-% to about 10 wt.-%, and most preferred of about 3 wt.-% to about 12 wt.-% of at least one sequestering agent, preferably methylglycinediacetate (MGDA); based on the total weight amount of the disinfectant cleaner composition of the invention, preferably in form of a concentrate.

A diluted disinfectant cleaner composition of the invention may comprise about 0 wt.-% to about 0.05 wt.-%, preferably about 0.0001 wt.-% to about 0.04 wt.-%, more preferred about 0.0003 wt.-% to about 0.03 wt.-%, and most preferred of about 0.0005 wt.-% to about 0.02 wt.-% of at least one sequestering agent, preferably methylglycinediacetate (MGDA); based on the total weight amount of the diluted disinfectant cleaner composition of the invention.

It should be understood that the sequestering agent can include mixtures of different sequestering agents.

It should be understood that the disinfectant cleaner composition can be preferably free of a sequestering agent.

Additional Functional Ingredients

The compositions of the invention may be suitable for use in a variety of cleaning compositions, including applications of use set forth in the methods of the invention. In an aspect of the invention, the compositions may be further formulated to include additional surfactants and/or additional functional ingredients (e.g. surfactants, additional sanitizing agents (e.g. alkanolamines), chelants and/or builders (e.g. chelant and/or remove water hardness to increase sanitizing performance of quaternary ammonium compound), solvents, sequestrants, antiredeposition agents, thickening agents, bleaching agents, fillers, defoaming agents, dispersants, dyes, fragrances, preservatives, other adjuvants, hydrotropes, water and the like), such as those described, for example, in U.S. Pat. No. 7,341,983, which is herein incorporated by reference. It should be understood by those of skill in the art and others that the particular materials are given by way of example only, and that a broad variety of other functional materials may be used. For example, many of the functional materials relate to materials used in cleaning applications, but it should be understood that other embodiments may include functional materials for use in other applications.

In an aspect, the compositions include from about 0 wt-%-30 wt-% additional functional ingredients, from about 0 wt-%-20 wt-% additional functional ingredients, from about 0 wt-%-10 wt-% additional functional ingredients, or more preferably from about 0 wt-%-5 wt-% additional functional ingredients. In addition, without being limited according to the invention, all ranges recited are inclusive of the numbers defining the range and include each integer within the defined range.

Stabilizing Agents

In some embodiments, the compositions of the present invention include one or more stabilizing agents in addition to the chelant component mentioned supra. The stabilizing agents can be used, for example, to stabilize the composition components and prevent their interaction.

Suitable stabilizing agents include, for example, chelating agents or sequestrants. Suitable sequestrants include, but are not limited to, organic chelating compounds that sequester metal ions in solution, particularly transition metal ions. Such sequestrants include organic amino- or hydroxy-polyphosphonic acid complexing agents (either in acid or soluble salt forms), carboxylic acids (e.g., polymeric polycarboxylate), hydroxycarboxylic acids, aminocarboxylic acids, or heterocyclic carboxylic acids, e.g., pyridine-2,6-dicarboxylic acid (dipicolinic acid).

In some embodiments, the compositions of the present invention include dipicolinic acid as a stabilizing agent. Compositions including dipicolinic acid can be formulated to be free or substantially free of phosphorous. It has also been observed that the inclusion of dipicolinic acid in a composition of the present invention aids in achieving the phase stability of the compositions, compared to other conventional stabilizing agents, e.g., 1-hydroxy ethylidene-1,1-diphosphonic acid ($CH_3C(PO_3H_2)_2OH$) (HEDP).

In other embodiments, the sequestrant can be or include phosphonic acid or phosphonate salt. Suitable phosphonic acids and phosphonate salts include HEDP; ethylenediamine tetrakis methylenephosphonic acid (EDTMP); diethylenetriamine pentakis methylenephosphonic acid (DTPMP); cyclohexane-1,2-tetramethylene phosphonic acid; amino[tri(methylene phosphonic acid)]; (ethylene diamine[tetra methylene-phosphonic acid)]; 2-phosphene butane-1,2,4-tricarboxylic acid; or salts thereof, such as the alkali metal salts, ammonium salts, or alkyloyl amine salts, such as mono, di, or tetra-ethanolamine salts; picolinic, dipicolinic acid or mixtures thereof. In some embodiments, organic phosphonates, e.g., HEDP are included in the compositions of the present invention.

Commercially available food additive chelating agents include phosphonates sold under the trade name DEQUEST® including, for example, 1-hydroxyethylidene-1,1-diphosphonic acid, available from Monsanto Industrial Chemicals Co., St. Louis, Mo., as DEQUEST® 2010; amino(tri(methylenephosphonic acid)), ($N[CH_2PO_3H_2]_3$), available from Monsanto as DEQUEST® 2000; ethylenediamine[tetra(methylenephosphonic acid)] available from Monsanto as DEQUEST® 2041; and 2-phosphonobutane-1,2,4-tricarboxylic acid available from Mobay Chemical Corporation, Inorganic Chemicals Division, Pittsburgh, Pa., as Bayhibit AM.

The sequestrant can be or include aminocarboxylic acid type sequestrant. Suitable aminocarboxylic acid type sequestrants include the acids or alkali metal salts thereof, e.g., amino acetates and salts thereof. Suitable aminocarboxylates include N-hydroxyethylaminodiacetic acid; hydroxyethylenediaminetetraacetic acid, nitrilotriacetic acid (NTA); ethylenediaminetetraacetic acid (EDTA); N-hydroxyethyl-ethylenediaminetriacetic acid (HEDTA); diethylenetriaminepentaacetic acid (DTPA); and alanine-N,N-diacetic acid; and the like; and mixtures thereof.

The sequestrant can be or include a polycarboxylate. Suitable polycarboxylates include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, polymaleic acid, polyfumaric acid, copolymers of acrylic and itaconic acid, phosphino polycarboxylate, acid or salt forms thereof, mixtures thereof, and the like.

Wetting or Defoaming Agents

Also useful in the compositions of the invention are wetting and defoaming agents. Wetting agents function to increase the surface contact or penetration activity of the antimicrobial composition of the invention. Wetting agents which can be used in the composition of the invention include any of those constituents known within the art to raise the surface activity of the composition of the invention.

Generally, defoamers which can be used in accordance with the invention include silica and silicones; aliphatic acids or esters; alcohols; sulfates or sulfonates; amines or amides; halogenated compounds such as fluorochlorohydrocarbons; vegetable oils, waxes, mineral oils as well as their sulfonated or sulfated derivatives; fatty acids and/or their soaps such as alkali, alkaline earth metal soaps; and phosphates and phosphate esters such as alkyl and alkaline diphosphates, and tributyl phosphates among others; and mixtures thereof.

In some embodiments, the compositions of the present invention can include antifoaming agents or defoamers which are of food grade quality given the application of the method of the invention. To this end, one of the more effective antifoaming agents includes silicones. Silicones such as dimethyl silicone, glycol polysiloxane, methylphenol polysiloxane, trialkyl or tetralkyl silanes, hydrophobic silica defoamers and mixtures thereof can all be used in defoaming applications. Commercial defoamers commonly available include silicones such as Ardefoam® from Armour Industrial Chemical Company which is a silicone bound in an organic emulsion; Foam Kill® or Kresseo® available from Krusable Chemical Company which are silicone and non-silicone type defoamers as well as silicone esters; and Anti-Foam A® and DC-200 from Dow Corning Corporation which are both food grade type silicones among others.

Thickening or Gelling Agents

The compositions of the present invention can include any of a variety of known thickeners. Suitable thickeners include natural gums such as xanthan gum, guar gum, or other gums from plant mucilage; polysaccharide based thickeners, such as alginates, starches, and cellulosic polymers (e.g., carboxymethyl cellulose); polyacrylates thickeners; and hydrocolloid thickeners, such as pectin. In an embodiment, the thickener does not leave contaminating residue on the surface of an object. For example, the thickeners or gelling agents can be compatible with food or other sensitive products in contact areas. Generally, the concentration of thickener employed in the present compositions or methods will be dictated by the desired viscosity within the final composition.

Solidification Agent

The present compositions can include a solidification agent, which can participate in maintaining the compositions in a solid form. In some embodiments, the solidification agent can form and/or maintain the composition as a solid. In other embodiments, the solidification agent can solidify the composition without unacceptably detracting from the eventual release of the sulfonated peroxycarboxylic acid. The solidification agent can include, for example, an organic or inorganic solid compound having a neutral inert character or making a functional, stabilizing or detersive contribution to the present composition. Suitable solidification agents include solid polyethylene glycol (PEG), solid polypropylene glycol, solid EO/PO block copolymer, amide, urea (also known as carbamide), nonionic surfactant (which can be employed with a coupler), anionic surfactant, starch that has been made water-soluble (e.g., through an acid or alkaline treatment process), cellulose that has been made water-soluble, inorganic agent, poly(maleic anhydride/methyl vinyl ether), polymethacrylic acid, other generally functional or inert materials with high melting points, mixtures thereof, and the like;

Suitable glycol solidification agents include a solid polyethylene glycol or a solid polypropylene glycol, which can, for example, have molecular weight of about 1,400 to about 30,000. In certain embodiments, the solidification agent includes or is solid PEG, for example PEG 1500 up to PEG 20,000. In certain embodiments, the PEG includes PEG 1450, PEG 3350, PEG 4500, PEG 8000, PEG 20,000, and the like. Suitable solid polyethylene glycols are commercially available from Union Carbide under the tradename CARBOWAX.

Suitable amide solidification agents include stearic monoethanolamide, lauric diethanolamide, stearic diethanolamide, stearic monoethanol amide, cocodiethylene amide, an alkylamide, mixtures thereof, and the like. In an embodiment, the present composition can include glycol (e.g., PEG) and amide.

Suitable nonionic surfactant solidification agents include nonylphenol ethoxylate, linear alkyl alcohol ethoxylate, ethylene oxide/propylene oxide block copolymer, mixtures thereof, or the like. Suitable ethylene oxide/propylene oxide block copolymers include those sold under the Pluronic tradename (e.g., Pluronic 108 and Pluronic F68) and commercially available from BASF Corporation. In some embodiments, the nonionic surfactant can be selected to be solid at room temperature or the temperature at which the composition will be stored or used. In other embodiments, the nonionic surfactant can be selected to have reduced aqueous solubility in combination with the coupling agent. Suitable couplers that can be employed with the nonionic surfactant solidification agent include propylene glycol, polyethylene glycol, mixtures thereof, or the like.

Suitable anionic surfactant solidification agents include linear alkyl benzene sulfonate, alcohol sulfate, alcohol ether sulfate, alpha olefin sulfonate, mixtures thereof, and the like. In an embodiment, the anionic surfactant solidification agent is or includes linear alkyl benzene sulfonate. In an embodiment, the anionic surfactant can be selected to be solid at room temperature or the temperature at which the composition will be stored or used.

Suitable inorganic solidification agents include phosphate salt (e.g., alkali metal phosphate), sulfate salt (e.g., magnesium sulfate, sodium sulfate or sodium bisulfate), acetate salt (e.g., anhydrous sodium acetate), Borates (e.g., sodium borate), Silicates (e.g., the precipitated or fumed forms (e.g., Sipernat 50® available from Degussa), carbonate salt (e.g., calcium carbonate or carbonate hydrate), other known hydratable compounds, mixtures thereof, and the like. In an embodiment, the inorganic solidification agent can include organic phosphonate compound and carbonate salt, such as an E-Form composition.

In some embodiments, the compositions of the present invention can include any agent or combination of agents that provide a requisite degree of solidification and aqueous solubility can be included in the present compositions. In other embodiments, increasing the concentration of the solidification agent in the present composition can tend to increase the hardness of the composition. In yet other embodiments, decreasing the concentration of solidification agent can tend to loosen or soften the concentrate composition.

In some embodiments, the solidification agent can include any organic or inorganic compound that imparts a solid character to and/or controls the soluble character of the present composition, for example, when placed in an aqueous environment. For example, a solidifying agent can provide controlled dispensing if it has greater aqueous solubility compared to other ingredients in the composition. Urea can be one such solidification agent. By way of further example, for systems that can benefit from less aqueous solubility or a slower rate of dissolution, an organic nonionic or amide hardening agent may be appropriate.

In some embodiments, the compositions of the present invention can include a solidification agent that provides for convenient processing or manufacture of the present composition. For example, the solidification agent can be selected to form a composition that can harden to a solid form under ambient temperatures of about 30 to about 50° C. after mixing ceases and the mixture is dispensed from the mixing system, within about 1 minute to about 3 hours, or about 2 minutes to about 2 hours, or about 5 minutes to about 1 hour. The compositions of the present invention can include solidification agent at any effective amount. The amount of solidification agent included in the present composition can vary according to the type of composition, the ingredients of the composition, the intended use of the composition, the quantity of dispensing solution applied to the solid composition over time during use, the temperature of the dispensing solution, the hardness of the dispensing solution, the physical size of the solid composition, the concentration of the other ingredients, the concentration of the cleaning agent in the composition, and other like factors.

Concentrate

The disinfectant cleaner composition can be presented in a liquid concentrated form. The source of alkalinity and addition of the solvent, preferably water, are provided so that the concentrated, preferably aqueous, liquid composition of the disinfectant cleaner composition according to the present invention may have a pH in the range of about 7 pH to about 14 pH, preferably is from about 9 pH to about 13 pH, and more preferred is from about 10 pH to about 12 pH.

According to one embodiment, the disinfectant cleaner composition of the invention, preferably in form of a concentrate, may comprise: about 1 wt.-% to about 30 wt.-%, preferably about 2 wt.-% to about 24 wt.-%, more preferred about 3 wt.-% to about 18 wt.-%, and most preferred of about 4 wt.-% to about 11 wt.-% of at least one biocidal quaternary ammonium compound, preferably a quaternary ammonium chloride of N-alkyl dimethyl benzyl ammonium chloride, further preferred a mixture of a N-alkyl(C8-C18) dimethyl benzyl ammonium chloride, further preferred dodecyl dimethyl benzyl ammonium chloride and/or more preferred a N-alkyl(C10-C18)dimethyl benzyl ammonium chloride mixture; and/or mixtures thereof; about 1 wt.-% to about 30 wt.-%, preferably about 2 wt.-% to about 24 wt.-%, more preferred about 3 wt.-% to about 18 wt.-%, and most preferred of about 4 wt.-% to about 12 of at least one antimicrobial amine, preferably a bis(3-aminopropyl) C8-C18 alkylamine, and most preferred N-(3-aminopropyl)-N-dodecylpropane-1,3-diamene; about 0.001 wt.-% to about 10 wt.-%, preferably about 0.005 wt.-% to about 8 wt.-%, more preferred about 0.01 wt.-% to about 5 wt.-%, and most preferred of about 0.05 wt.-% to about 2 wt.-% anionic scale inhibitor, preferably an ethanolamine-N,N-bis(methylene phosphonate), wherein the ethanolamine-N,N-bis(methylene phosphonate) has the formula:

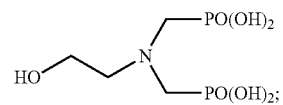

about 0 wt.-% to about 40 wt.-%, preferably about 0 wt.-% to about 25 wt.-%, more preferred about 1 wt.-% to about 19 wt.-%, and most preferred of about 5 wt.-% to about 15 wt.-% of at least one aromatic alcohol, preferably phenoxy alkanol, wherein the alkanol has from about 1 to about 6 carbon atoms or any combination thereof, and most preferred phenoxy ethanol; about 0 wt.-% to about 4 wt.-%, preferably about 0.001 wt.-% to about 2 wt.-%, more preferred about 0.01 wt.-% to about 1 wt.-%, and most preferred of about 0.1 wt.-% to about 0.5 wt.-% of at least one corrosion inhibitor, preferably benzotriazole, and most preferred at least one 1,2,3-benzotriazole; a solvent of about 0 wt.-% to about 92 wt.-%, preferably about 20 wt.-% to about 80 wt.-%, more preferred about 50 wt.-% to about 75 wt.-%, and further more preferred about 55 wt.-% to about 70 wt.-%, preferably the solvent is added to 100 wt.-%, and most preferably the solvent is water; wherein the weight.-% of the components are based on the total weight of disinfectant cleaner composition and the weight.-% of all components of the composition are select so that it does not exceed 100 wt.-%.

Ready-to-Use Composition

The disinfectant cleaner composition of the invention can be present in form of a diluted or so called "ready-to-use" composition. The source of alkalinity and addition of the solvent, preferably water, are provided so that the diluted, preferably aqueous, liquid composition of the disinfectant cleaner composition according to the present invention may have a pH in the range of about 7 pH to about 12 pH, preferably is from about 7.5 pH to about 11.5 pH, and more preferred is from about 9 pH to about 11 pH.

According to one aspect of the invention, the concentrated disinfectant cleaner composition can be diluted with a at least one solvent, preferably water, by a factor of 10 to 1000, preferably 20 to 500 and further preferred 25 to 400 to obtain the diluted disinfectant cleaner composition of the invention.

According to one aspect, the diluted disinfectant cleaner composition (ready-to-use) can be diluted with a solvent, preferably water, to a 0.25% to 4.0% solution from a concentrated disinfectant composition. The water may be hard water, wherein hard water comprises dissolved minerals including calcium, magnesium, and manganese.

It will be appreciated that the actual concentration of components in a composition of the invention will depend on the intended use of that composition. For disinfecting uses, such as cleaning of hospital wards and equipment to help prevent the spread of disease such as Norovirus, Adenovirus and Polyomavirus, higher concentrations are required than for certain sanitizing applications.

According to one embodiment, the diluted disinfectant cleaner composition may comprise: about 0.0001 wt.-% to about 3 wt.-%, preferably about 0.0005 wt.-% to about 2 wt.-%, more preferred about 0.001 wt.-% to about 1 wt.-%, and most preferred of about 0.005 wt.-% to about 0.5 wt.-% of at least one biocidal quaternary ammonium compound, preferably a quaternary ammonium chloride of N-alkyl dimethyl benzyl ammonium chloride, further preferred a mixture of a N-alkyl(C8-C18)dimethyl benzyl ammonium chloride, further preferred dodecyl dimethyl benzyl ammonium chloride and/or more preferred a N-alkyl(C10-C18) dimethyl benzyl ammonium chloride mixture; and/or mixtures thereof; about 0.0005 wt.-% to about 3 wt.-%, preferably about 0.001 wt.-% to about 2 wt.-%, more preferred about 0.005 wt.-% to about 1 wt.-%, and most preferred of about 0.01 wt.-% to about 0.5 wt.-% of at least one antimicrobial amine, preferably a bis(3-aminopropyl) C8-C18 alkylamine, and most preferred N-(3-aminopropyl)-N-dodecylpropane-1,3-diamene; about 0.000005 wt.-% to about 2 wt.-%, preferably about 0.00001 wt.-% to about 1 wt.-%, more preferred about 0.00005 wt.-% to about 0.5 wt.-%, and most preferred of about 0.0001 wt.-% to about 0.1 wt.-% of an anionic scale inhibitor, preferably an ethanolamine-N,N-bis(methylene phosphonate) having the formula:

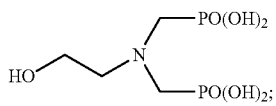

about 0 wt.-% to about 5 wt.-%, preferably about 0.0001 wt.-% to about 3 wt.-%, more preferred about 0.001 wt.-% to about 2 wt.-%, and most preferred of about 0.01 wt.-% to about 1 wt.-% of at least one aromatic alcohol, preferably a phenoxy alkanol, wherein the alkanol has from about 1 to about 6 carbon atoms or any combination thereof, and most preferred phenoxy ethanol; about 0 wt.-% to about 1 wt.-%, preferably about 0.00001 wt.-% to about 0.5 wt.-%, more preferred about 0.00005 wt.-% to about 0.1 wt.-%, and most preferred of about 0.0001 wt.-% to about 0.5 wt.-% of at least one corrosion inhibitor, preferably benzotriazole, and most preferred at least one 1,2,3-benzotriazole; a solvent of about 0 wt.-% to about 100 wt.-%, preferably about 0.05 wt.-% to about 99.5 wt.-%, more preferred about 0.05 wt.-% to about 99 wt.-%, and further more preferred about 0.07 wt.-% to about 99 wt.-%, preferably the solvent is added to 100 wt.-%, and most preferably the solvent is water; wherein the weight perfect of the components are based on the total weight of disinfectant cleaner composition and the weight percent of all components of the composition are select so that it does not exceed 100 wt.-%.

Use of the Disinfectant Composition

According to an embodiment of the invention, a method of employing a sanitizing composition comprises:

contacting a surface, article, and/or substrate with a sanitizing composition comprising:
a) at least one biocidal quaternary ammonium compound;
b) at least one biocidal tertiary amine; and
c) an amino-phosphonate scale inhibitor,
wherein the weight % ratio of the at least one biocidal quaternary ammonium chloride and the at least one biocidal tertiary amine is in the range of about 0.1:1 to about 1:1.

According to another aspect of the invention, the contacting results in inactivation and/or reduction of infectious agents on the surface, article, and/or substrate. The infectious agents may comprise bacteria, viruses, and/or yeasts. Preferably, the infectious agents are mycobacteria, Polyomavirus, Papillomavirus, Adenovirus, Norovirus, and/or Simmianvirus 40.

The disinfectant cleaner composition according to the invention can be used for inactivating and/or reducing infectious agents, comprising bacteria, virus, and/or yeasts. More specifically, the composition has a tuberculocidal or mycobactericidal efficacy and efficacy against Norovirus, Adenovirus and Polyomavirus.

The disinfectant cleaner composition of the invention gives a reduction in the number of microorganisms and viruses, preferably Norovirus, Adenovirus and/or Polyomavirus which is at least log 3.0. Preferably a disinfectant cleaner composition of the invention having a residual effect and tested in this manner will give a log reduction of at least about 3.0, more preferably of at least about 4.0.

In use the compositions of the invention act to substantially inactivating and/or reducing infectious agents, comprising bacteria, virus, and/or yeasts, for example on surfaces in hospitals, industrial facilities and research laboratories, particularly selected from surfaces of instruments employed in medical, dental, and pharmaceutical procedures, surfaces of equipment, the inanimate patient environment, inanimate surfaces in operating theatres and other areas within healthcare, processing facilities or containers used in the food service, food processing, butchery, dairy, beverage, brewery, and pharmaceutical industries, work surfaces, walls, floors, ceilings, fermentation tanks, and fluid supply lines. Using the disinfectant compositions according to the invention can take the form of a concentrate that can be diluted and combined to provide a ready-to-use solution, and as a ready-to-use liquid composition that can be used to clean articles having a metal or plastic surface, such as surgical, medical, and dental instruments, including endoscopes.

Metal surfaces and/or plastic surfaces in need of disinfecting and cleaning are found in several locations. Exemplary locations include surgical instruments, medical instruments, and dental instruments, sinks, cookware, utensils, machine parts, vehicles, tanker trucks, vehicle wheels, work surfaces, tanks, immersion vessels, spray washers, and ultrasonic baths.

Metal surfaces that can be disinfected include iron-based metals such as iron, iron alloys, e.g. steel, tin, aluminum, copper, tungsten, titanium, molybdenum, etc., for example. The structure of the metal surface to be disinfected can vary widely. Thus, the metal surface and/or plastic surface can be as a metal and/or plastic part of complex configuration, sheeting, coils, rolls, bars, rods, plates, disks, etc.

More preferred is the use of the disinfectant cleaner composition of the invention, in particular the ready-to-use composition to disinfect metal and/or plastic articles, especially metal instruments, plastic instruments, instruments with a plastic surface and/or instruments with a metal surface, surfaces of equipment, the inanimate patient environment, inanimate surfaces in operating theatres and other areas within healthcare.

The disinfectant composition, preferably the ready-to-use-composition, can be applied to a surface by wiping the treated surface with a saturated cloth, mop, sponge or other suitable delivery mechanism. The composition can also be applied by spraying and/or flooding the surface with the disinfectant composition or by immersion of items in the use solution.

The disinfectant cleaner composition of the invention is maybe suitable for a variety of consumer applications. Examples of the formulations of the invention include, but are not limited to surface cleaners such as those intended for use in hospitals, short-term and long-term care facilities, bathrooms, kitchens, living areas hard floor cleaners carpet cleaners furniture cleaners, glass/mirror cleaners; toilet care products including solid toilet cleaners such as rim devices and those designed to be placed in the cistern liquid toilet cleaners excluding those comprising hypochlorite bleaches: dishwashing products such as washing up liquids and preparations from dishwashing machines such as dishwashing 7 pH to about 14 pH, preferably is from about 9 pH to about 13 pH, and more preferred is from about 10 pH to about 12 pH liquids; laundry products such as liquid detergents and fabric conditioners and "2 in 1" products comprising detergent and fabric conditioner; cleaning products intended for use outdoors such as those for cleaning for wood, stone, concrete or plastics, for example patio cleaner, garden furniture cleaners/treatments, BBQ cleaners, wall and fence cleaners/treatments, plant sprays such as those intended to remove insects such as aphides from plants; food sprays, such as those suitable for use in food preservation; personal care products such as bath and shower products; soaps, including liquid soaps, hand sanitizers, deodorants and antiperspirants, hair care products including shampoos, for example anti-scalp odor shampoos, shampoos for the control of head lice eggs and anti-dandruff shampoos, hair conditioners, hair styling products such as hair mousses, gels and sprays, skin care products such as shaving products, cosmetics and products for hair removal; baby products including baby cleaning and cleansing products such as baby bath, soaps, wipes, moisturizers, nappy rash cream, products for cleaning surfaces that have regular & high incidence of infant & baby contact; first aid products and products for treating ailments and illnesses, including products for the topical treatment and/or prevention of minor infections such as athletes foot, spot/acne prevention/treatment products; foot hygiene products, including those for use on the foot and those for the toot ware, particularly sports foot wear; products for cleaning and/or deodorizing vehicles such as cars.

Method of Making

The invention also provides a process for making the compositions of the invention. The process comprises the steps of mixing at least part of at least one biocidal quaternary ammonium compound, preferably a quaternary ammonium chloride of N-alkyl dimethyl benzyl ammonium chloride, wherein said alkyl has from about 8 to about 18 carbon atoms, further preferred a dodecyl dimethyl benzyl ammonium chloride mixture, and adding the at least one biocidal quaternary amine, preferably a bis(3-aminopropyl)alkylamine wherein said alkyl has from about 6 to about 18 carbon atoms, further preferred N-(3-aminopropyl)-N-dodecylpropane-1,3-diamene; wherein the weight-% ratio of a) a biocidal quaternary ammonium compound, to b) a biocidal tertiary amine, is in the range of about 0.1:1 to about 1:1, in the appropriate amounts to achieve the synergy of the two. An amino-phosphonate scale inhibitor, preferably an ethanolamine-N,N-bis(methylene phosphonate), is added to the biocidal quaternary ammonium compound and the biocidal tertiary amine along with any further components, such as phenoxy ethanol, corrosion inhibitor, and solvent, and agitating the resulting mixture until a homogenous solution is formed. Typically, the process to produce the compositions of the invention is carried out at room temperature with stirring. The present invention provides compositions obtainable by the process set out above. The compositions of the invention may be prepared in a concentrated form (i.e. with no solvent or little solvent) and diluted with a solvent, preferably water when used to the diluted disinfectant cleaner solution. The concentrate may be diluted with hard water.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

Those skilled in the art will recognize, or be able to ascertain using no more than routine experimentation, numerous equivalents to the specific procedures, embodiments, claims, and examples described herein. Such equivalents are considered to be within the scope of this invention and covered by the claims appended hereto. The contents of all references, patents, and patent applications cited throughout this application are hereby incorporated by reference to the same extent as if each individual publication or patent application was specifically and individually indicated as incorporated by reference. All publications and patent applications in this specification are indicative of the level of ordinary skill in the art to which this invention pertains. The invention is further illustrated by the following examples, which should not be construed as further limiting.

Exemplary Compositions of the Invention

Examples of useful ranges of the components (listed as active concentrations) for the concentrated disinfectant cleaner composition of the invention include those provided in the following table, with water making up any remainder:

| Component | Weight Percent (wt-%) | Preferred wt-% | More Preferred wt-% | Most preferred wt-% |
| --- | --- | --- | --- | --- |
| biocidal quaternary ammonium compound | 1-30 | 2-24 | 3-18 | 4-11 |
| antimicrobial amine | 1-30 | 2-24 | 3-18 | 4-12 |
| anionic scale inhibitor | 0.001-10 | 0.005-8 | 0.01-5 | 0.05-2 |
| aromatic alcohol | 0-40 | 0-25 | 1-19 | 5-15 |
| corrosion inhibitor | 0-4 | 0.001-2 | 0.01-1 | 0.1-0.5 |
| other functional ingredients | 0-30 | 0-20 | 0-10 | 0-5 |

Examples of useful ranges of the components (listed as active concentrations) for a use solution of the disinfectant cleaner composition of the invention include those provided in the following table, with water making up any remainder:

| Component | Weight Percent (wt-%) | Preferred wt-% | More Preferred wt-% | Most preferred wt-% |
|---|---|---|---|---|
| biocidal quaternary ammonium compound | 0.0001-3 | 0.0005-2 | 0.001-1 | 0.005-0.5 |
| antimicrobial amine | 0.0005-3 | 0.001-2 | 0.005-1 | 0.01-0.5 |
| anionic scale inhibitor | 0.000005-2 | 0.00001-1 | 0.00005-0.5 | 0.0001-0.1 |
| aromatic alcohol | 0-5 | 0.0001-3 | 0.001-2 | 0.01-1 |
| corrosion inhibitor | 0-1 | 0.00001-0.5 | 0.00005-0.1 | 0.0001-0.5 |
| other functional ingredients | 0-10 | 0-5 | 0-1 | 0-0.1 |

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Existing quaternary amine based disinfectant cleaners comprising a quaternary ammonium chloride of N-alkyl dimethyl benzyl ammonium chloride and a bis(3-aminoproyl) alkylamine are effective at inactivating and reducing Norovirus, Adenovirus, and Polyomavirus. However, such cleaners develop scale and become cloudy when diluted for use solutions with hard water. Therefore, multiple scale-inhibiting agents were tested with this existing quaternary cleaning solution to find a combination which remained clear upon dilution with hard water.

The following example solutions were tested for water hardness to determine whether the solutions would remain clear upon dilution with hard water. The solutions were first diluted with deionized water. 5 g (0.5%), 20 g (2.0%), or 40 g (4.0%) of each exemplary composition were added to 1000 g deionized water and stirred for 5 minutes. Then 5 mL sodium bicarbonate solution was added to 1000 g deionized water along with 5 g, 20 g, or 40 g of each exemplary composition and 15 mL (30 gpg) hardness solution. This combination was against allowed to stir for five minutes. Results were recorded initially and after six hours.

Water Hardness Evaluation Methods:

Apparatus:
  4 place stirrer/hot plate with temperature control
  1000 ml or 1500 ml beakers
  Graduated 10 ml pipettes Reagent Preparation:
  Hardness Solution:
    Dissolve 33.45 g of $CaCl_2.2H_2O$ + 23.24 g $MgCl_2.6H_2O$ in a 1 liter volumetric flask and dilute to volume with DI water.
  Sodium Bicarbonate Solution:
    Dissolve 56.25 g $NaHCO_3.2H_2O$ in a 1 liter volumetric flask and dilute to volume with DI water.

TABLE 1

Formulations for Water Hardness Evaluation (wt-%)

| DI Water to 100% | Example 1 | Example 2 | Example 3 | Example 4 | Example 5 | Example 6 | Example 7 | Example 8 | Example 9 | Example 10 |
|---|---|---|---|---|---|---|---|---|---|---|
| Lonzabac 12.100 | 7-9 | 7-9 | 7-9 | 7-9 | 7-9 | 7-9 | 7-9 | 7-9 | 7-9 | 7-9 |
| Barquat DM50, 50% | 14-16 | 14-16 | 14-16 | 14-16 | 14-16 | 14-16 | 14-16 | 14-16 | 14-16 | 14-16 |
| Trilon M, 40% | 0.5 | 0 | 0 | 0 | 0 | 0 | 0 | 0 | 0 | 0 |
| Belclene 200, 50% | 0 | 0.4 | 0 | 0 | 0 | 0 | 0 | 0 | 0 | 0 |
| Dequest 2010, 60% | 0 | 0 | 0.34 | 0 | 0 | 0 | 0 | 0 | 0 | 0 |
| Merquat 281, 41% | 0 | 0 | 0 | 0.49 | 0 | 0 | 0 | 0 | 0 | 0 |
| Acusol 448, 50% | 0 | 0 | 0 | 0 | 0.4 | 0 | 0 | 0 | 0 | 0 |
| Dequest 2000, 50% | 0 | 0 | 0 | 0 | 0 | 0.4 | 0 | 0 | 0 | 0 |
| Belclene 810, 50% | 0 | 0 | 0 | 0 | 0 | 0 | 0.4 | 0 | 0 | 0 |
| Tartaric acid | 0 | 0 | 0 | 0 | 0 | 0 | 0 | 0.2 | 0 | 0 |
| SI 2670, 51% | 0 | 0 | 0 | 0 | 0 | 0 | 0 | 0 | 0.4 | 0 |
| Briquest 221-50A, 50% | 0 | 0 | 0 | 0 | 0 | 0 | 0 | 0 | 0 | 0.4 |
| Total | 100 | 100 | 100 | 100 | 100 | 100 | 100 | 100 | 100 | 100 |

DI Water—Deionized Water
Lonzabac 12.100—N-(3-aminopropyl)-N-dodecylpropane-1,3-diamine available from Lonza (Basel, Switzerland)
Barquat DM-50—C12-C16 Alkyl Dimethyl Benzyl Ammonium Chloride available from Lonza (Basel, Switzerland)
Trilon M (40%)—Methylglycine Diacetic acid sodium salt (MGDA) available from BASF (Ludwigshafen, Germany)
Belclene 200 (50%)—Polymaleic acid available from BWA Water Additives (Tucker, GA)
Dequest 2010 (60%)—1-Hydroxy Ethylidene-1,1-diphosphonic acid available from Italmatch Chemicals (Genova, Italy)
Merquat 281 (41%)—Copolymer of diallyl dimethyl ammonium chloride and acrylic acid available from Lubrizol (Wickliffe, OH)
Acusol 448 (50%)—Copolymer of acrylic and maleic acids available from Dow Chemical (Midland, Michigan)
Dequest 2000 (50%)—Amino Tri(methylenephosphonic acid) available from Italmatch Chemicals (Genova, Italy)
SI 2670 (51%)—Ethanolamine-N,N-bis(methylene phosphonate) available from Nalco-Champion (Sugar Land, TX)
Briquest 221-50A (50%)—Ethanolamine-N,N-bis(methylene phosphonate) available from Solvay (Brussels, Belgium)

The results of the hard water studies are shown in FIGS. 1-8. Examples 6 and 8 were excluded as Acusol 448 and Belclene 810 failed to go into solution upon stirring. In each of FIGS. 1-8, the initial solutions in deionized water are shown in the top row at various concentrations of the 5 experimental compositions. The second row shows the solutions after 6 hours. The third row shows the initial appearance of the solutions when diluted with hard water. Finally, the bottom row shows the solutions in hard water after 6 hours. The solutions of examples 9 and 10 were the only ones to remain clear in 30 gpg solutions after 6 hours. These solutions both included Ethanolamine-N,N-bis(methylene phosphonate).

TABLE 3-continued

Formulations for Water Hardness Evaluation

| | Example 11 | Example 12 | Example 13 | Example 14 |
|---|---|---|---|---|
| Protectol PE | 9-11 | 9-11 | 9-11 | 9-11 |
| Monoethanolamine | 2 | 2 | 2 | 2 |
| | 100 | 100 | 100 | 100 |

TABLE 2

Examples 1-10 held for 6 hours at ambient temperature

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Concentrate | Stable | Stable | Stable | Stable | Unstable | Stable | Unstable | Stable | Stable | Stable |
| 0.5% in DI Water | + | + | + | + | NA | + | NA | + | + | + |
| 2.0% in DI Water | + | − | + | + | NA | + | NA | + | + | + |
| 4.0% in DI Water | + | − | + | + | NA | + | NA | + | + | + |
| 0.5% in 30 gpg Water | + | + | + | − | NA | + | NA | − | + | + |
| 2.0% in 30 gpg Water | − | − | − | − | NA | − | NA | − | + | + |
| 4.0% in 30 gpg Water | − | − | − | − | NA | − | NA | − | + | + |

+ no precipitation/formula separation
− Hazy/precipitation observed

Multiple scale inhibitors were tested to determine which scale inhibitors remain stable in quaternary ammonium compositions and remain clear when diluted with hard water. The compositions of examples 9 and 10 were the only compositions which remained stable and clear upon dilution in hard water. Both of these compositions include scale inhibitors which comprise ethanolamine-N,N-bis(methylene phosphonate). Further compositions were tested for the qualities of remaining stable and clear when diluted with hard water.

Example 2

These initial experiments were followed by water hardness testing of exemplary solutions which further included 1,2,3-benzotriazole, C8-C14 alkyl polyglycoside, phenoxy ethanol, and Monoethanolamine. Examples 12-14 compared different scale inhibitors, including Ethanolamine-N,N-bis(methylene phosphonate), 1-Hydroxy Ethylidene-1,1-diphosphonic acid, and Amino tri(methylenephosphonic acid). The results are shown in FIGS. 9-12. The following formulations were used for these studies. Hardness testing was performed as described above in Example 1.

TABLE 3

Formulations for Water Hardness Evaluation

| | Example 11 | Example 12 | Example 13 | Example 14 |
|---|---|---|---|---|
| DI Water to 100% | | | | |
| Preventol BZT | 0.15-0.4 | 0.15-0.4 | 0.15-0.4 | 0.15-0.4 |
| Lonzabac 12.100 | 7-9 | 7-9 | 7-9 | 7-9 |
| Glucopon 650EC, 50% | 3-5 | 3-5 | 3-5 | 3-5 |
| Barquat DM50, 50% | 14-16 | 14-16 | 14-16 | 14-16 |
| Trilon M, 40% | 0 | 0 | 0 | 0 |
| SI 2670, 51% | 0 | 0.5 | 0 | 0 |
| Dequest 2010, 60% | 0 | 0 | 0.5 | 0 |
| Deuqest 2000, 50% | 0 | 0 | 0 | 0.5 |

Figure 9:
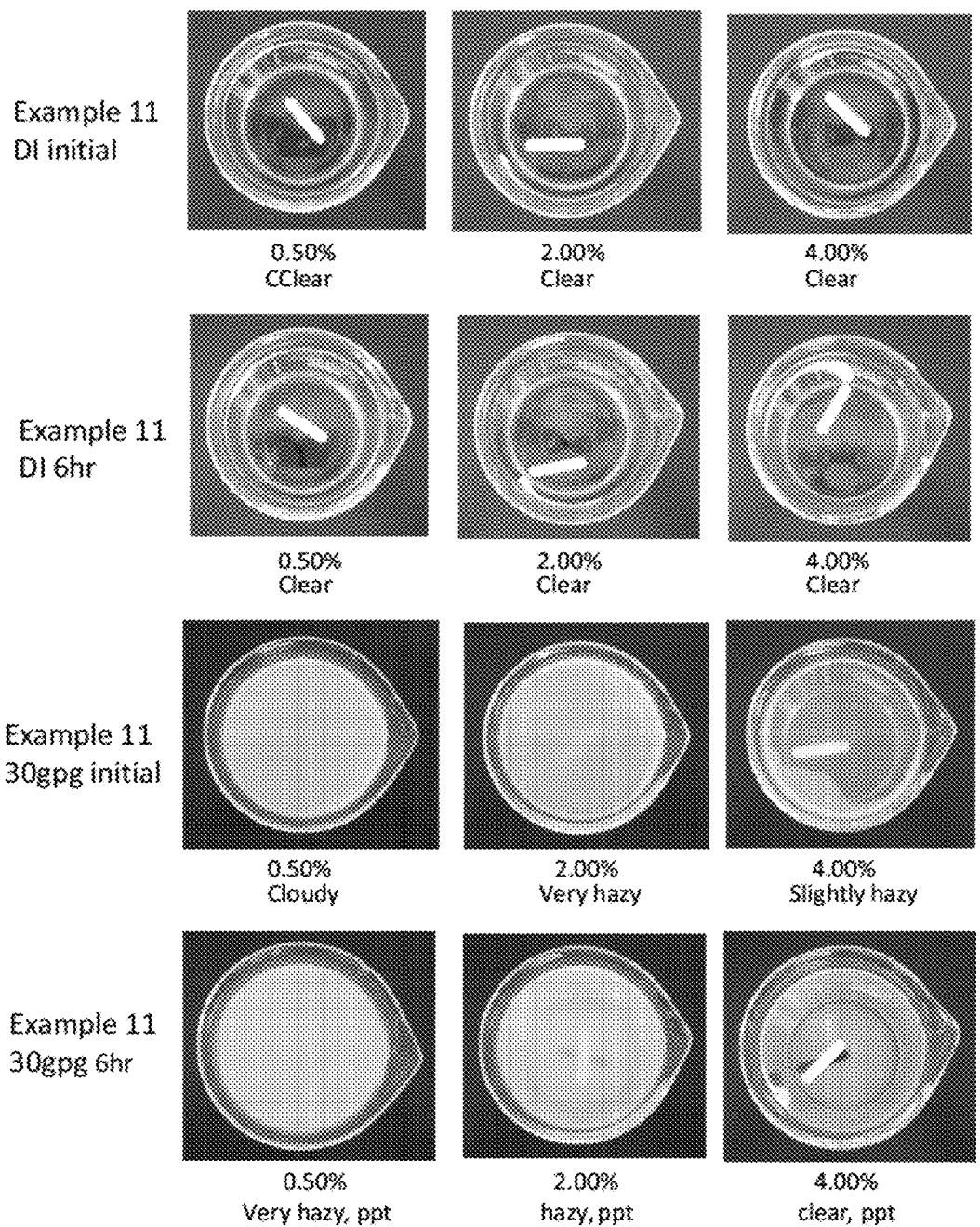
FIG. 9 shows the cleaning composition of example 11 diluted with deionized water (DI) after initial stirring and after 6 hours and then diluted with hard water (30 gpg) after initial stirring and after 6 hours.
Figure 10:
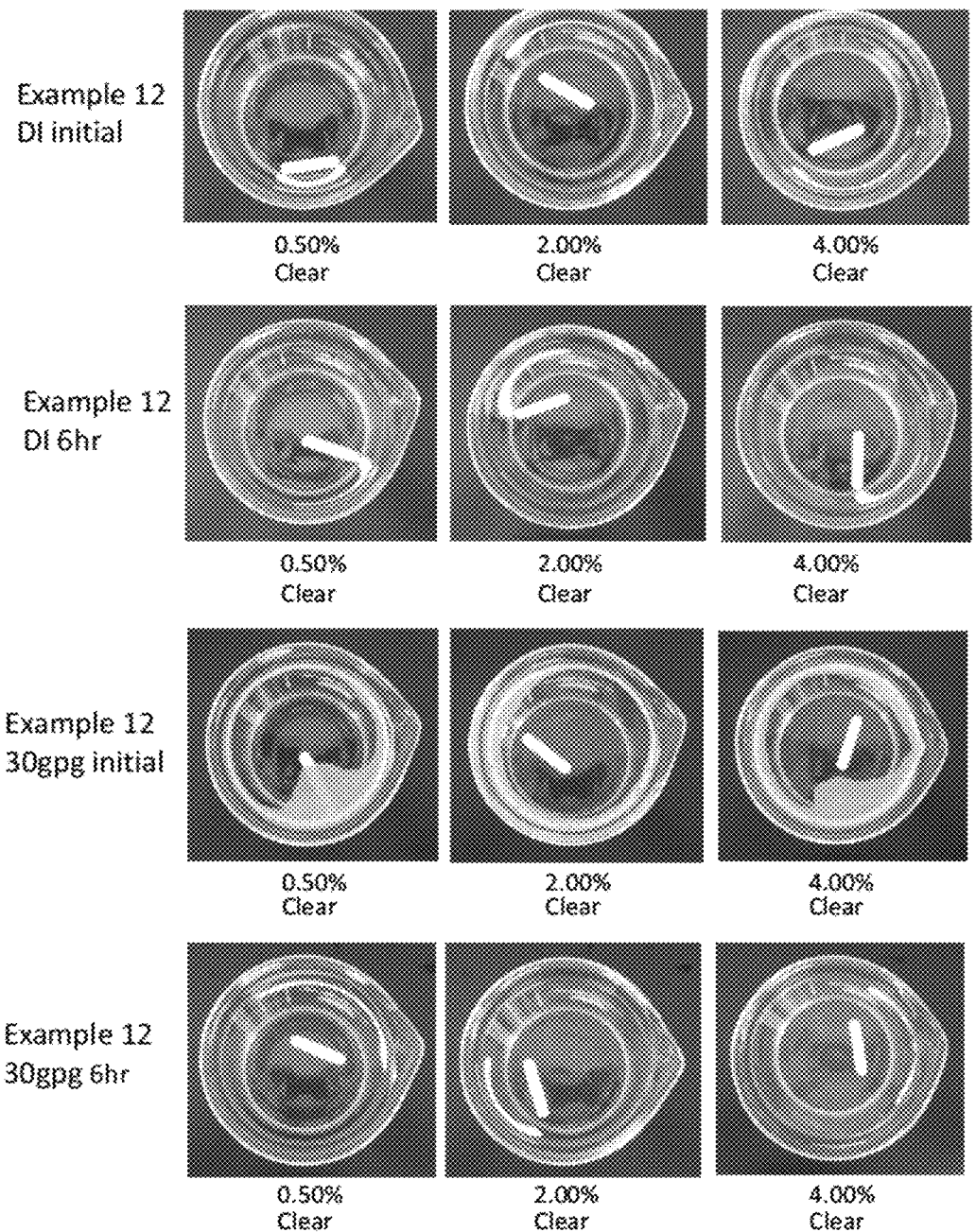
FIG. 10 shows the cleaning composition of example 12 diluted with deionized water (DI) after initial stirring and after 6 hours and then diluted with hard water (30 gpg) after initial stirring and after 6 hours.
Figure 11:
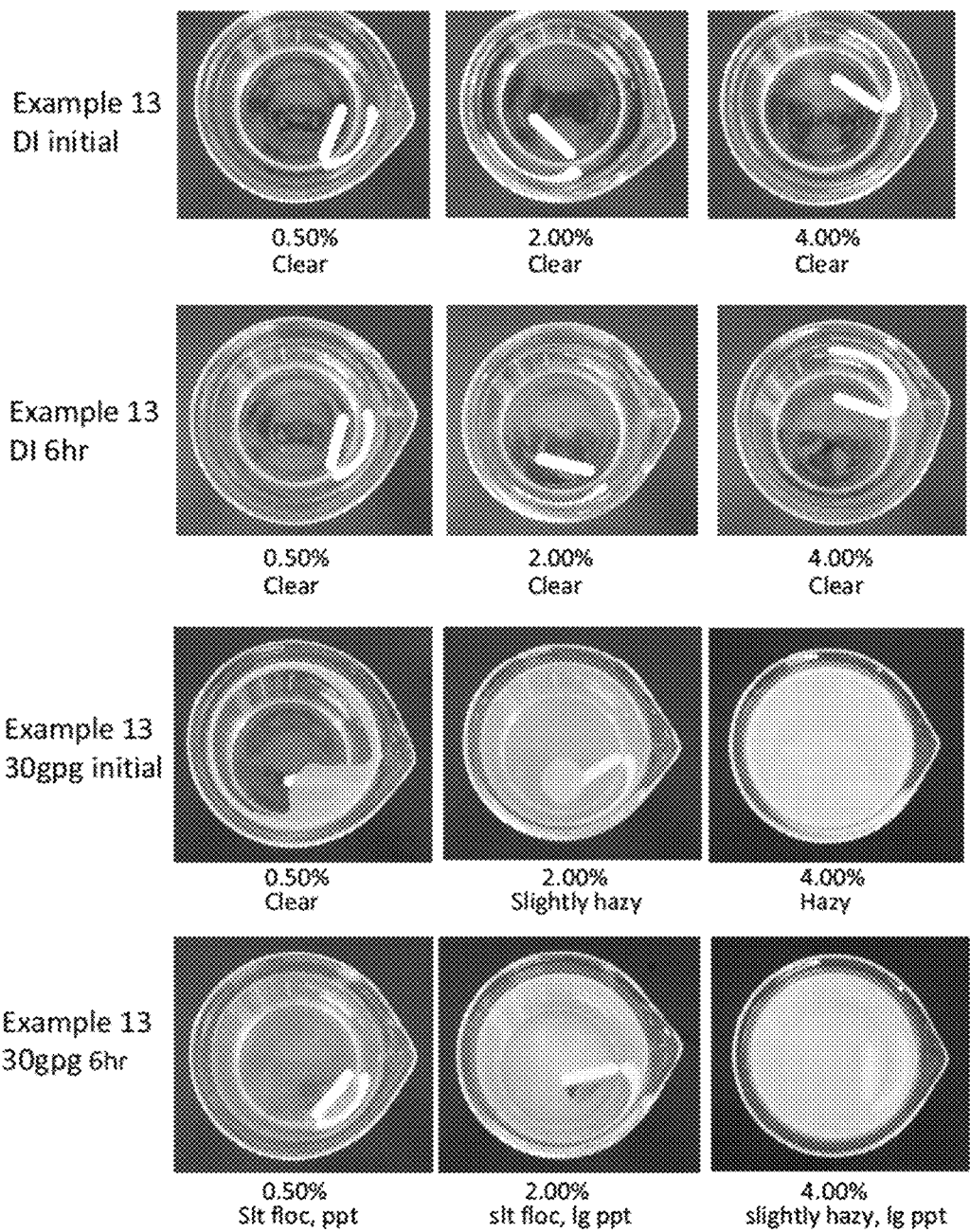
FIG. 11 shows the cleaning composition of example 13 diluted with deionized water (DI) after initial stirring and after 6 hours and then diluted with hard water (30 gpg) after initial stirring and after 6 hours.
Figure 12:
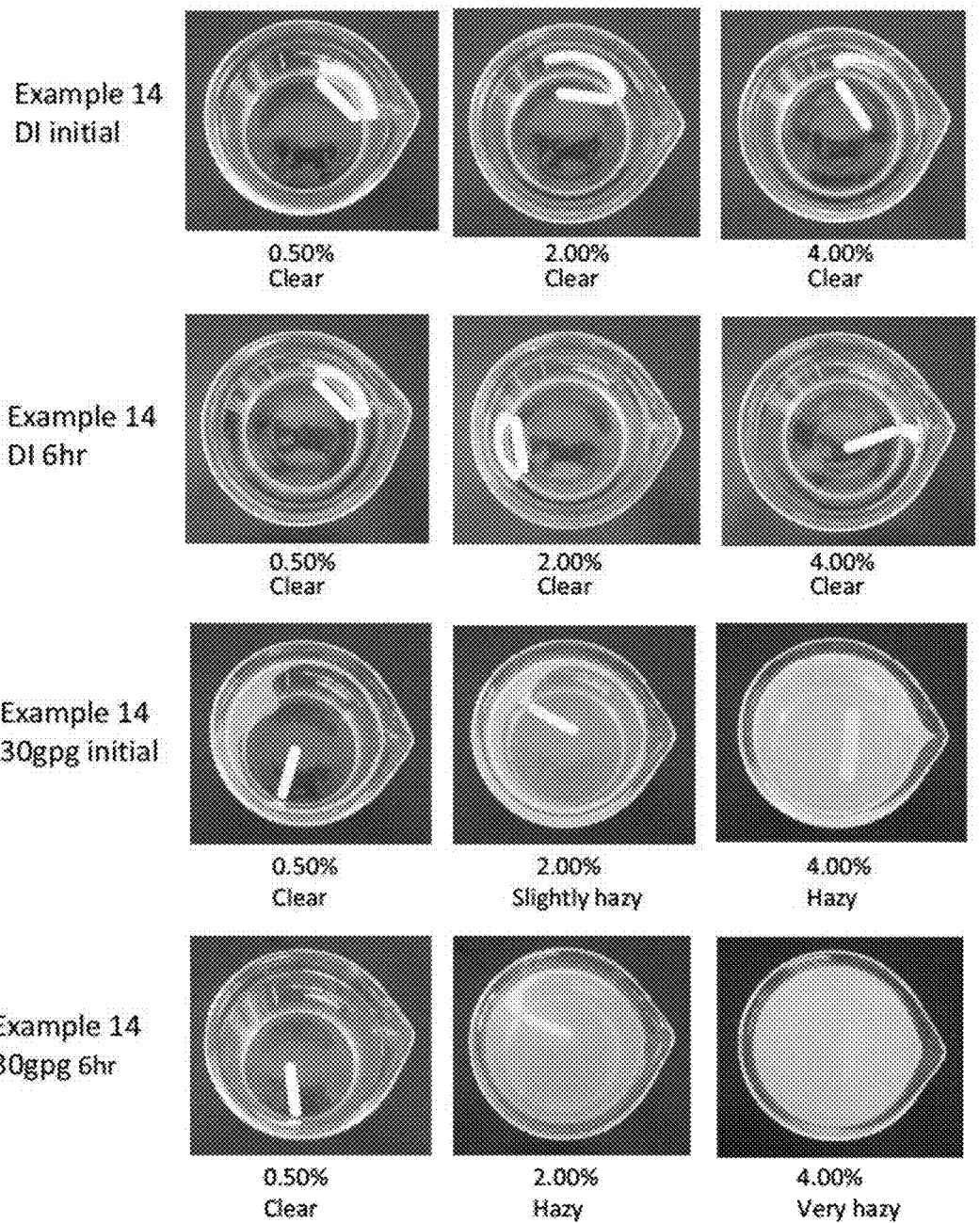
FIG. 12 shows the cleaning composition of example 14 diluted with deionized water (DI) after initial stirring and after 6 hours and then diluted with hard water (30 gpg) after initial stirring and after 6 hours.

Example 11 did not include a scale inhibitor and resulted in cloudy solutions at 30 gpg (FIG. 9). Addition of SI 2670 resulted in a clear solution at 30 gpg, both initially and after six hours.

TABLE 4

Examples 11-15 held for 6 hours at ambient temperature

| | Example 11 | Example 12 | Example 13 | Example 14 |
|---|---|---|---|---|
| Concentrate | Stable | Stable | Stable | Stable |
| 0.5% in DI Water | + | + | + | + |
| 2.0% in DI Water | + | + | + | + |
| 4.0% in DI Water | + | + | + | + |
| 0.5% in 30 gpg Water | − | + | − | + |
| 2.0% in 30 gpg Water | − | + | − | − |
| 4.0% in 30 gpg Water | + | + | − | − |

+ no precipitation/formula separation
− Hazy/precipitation observed

The results of these experiments showed that again, compositions comprising ethanolamine-N,N-bis(methylene phosphonate) (SI 2670) were the only compositions which remained clear and stable both when diluted with deionized water and 30 gpg water. Based on these results, further studies were done with ethanolamine-N,N-bis(methylene phosphonate) containing compositions to determine an optimal quantity of ethanolamine-N,N-bis(methylene phosphonate) to include in quaternary ammonium disinfectant compositions.

Example 3

It was determined that addition of ethanolamine-N,N-bis (methylene phosphonate) resulted in quaternary ammonium disinfectant solutions clear of cloudy hard water scale. Follow up studies were performed to determine an optimal amount of ethanolamine-N,N-bis(methylene phosphonate) to include in the quaternary ammonium cleaning compositions.

TABLE 5

Water Hardness Formulations

| | Example 15 | Example 16 | Example 17 | Example 18 |
|---|---|---|---|---|
| DI Water to 100% | | | | |
| Preventol BZT | 0.15-0.4 | 0.15-0.4 | 0.15-0.4 | 0.15-0.4 |
| Lonzabac 12.100 | 7-9 | 7-9 | 7-9 | 7-9 |
| Glucopn 650EC, 50% | 3-5 | 3-5 | 3-5 | 3-5 |
| Barquat DM50, 50% | 14-16 | 14-16 | 14-16 | 14-16 |
| Trilon M, 40% | 0.5 | 0 | 0 | 0 |
| Briquest 221-50A, 50% | 0 | 0.1 | 0.25 | 0.5 |
| Protectol PE | 9-11 | 9-11 | 9-11 | 9-11 |
| Monoethanolamine | 2 | 2 | 2 | 2 |
| Total | 100 | 100 | 100 | 100 |

Figure 13:
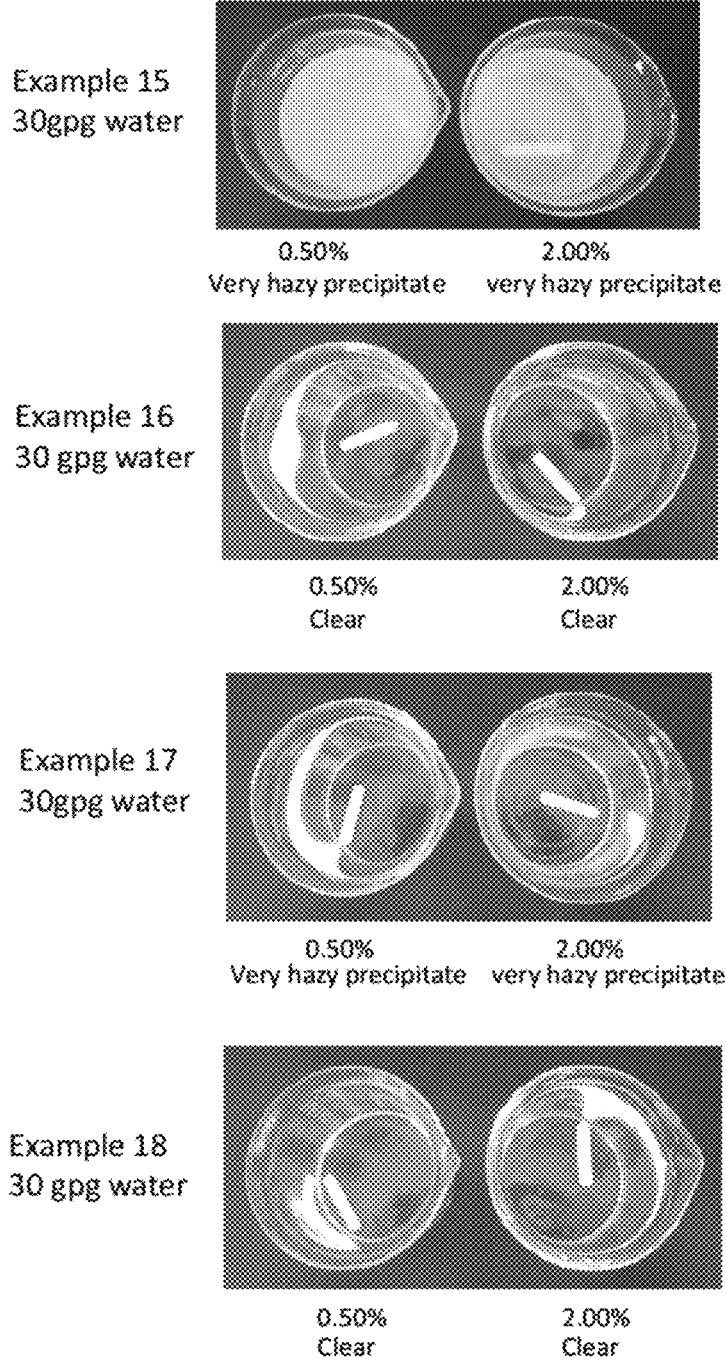
FIG. 13 shows the cleaning composition of examples 15-18 diluted with hard water (30 gpg).

The results of these studies are shown in FIG. 13, which indicates that the inclusion of 0.5 Briquest 221-50A in Example 18 was most effective at reducing scale. However, even 0.1 wt-% of Briquest 221-50A resulted in scale reduction compared to compositions that exclude ethanolamine-N,N-bis(methylene phosphonate).

TABLE 6

Examples 15-18 held at ambient temperature for 6 hours

| | Example 15 | Example 16 | Example 17 | Example 18 |
|---|---|---|---|---|
| Concentrate | Stable | Stable | Stable | Stable |
| 0.5% in 30 gpg Water | − | + | + | + |
| 2.0% in 30 gpg Water | − | + | + | + |

+ no precipitation/formula separation
− Hazy/precipitation observed

Compositions comprising Ethanolamine-N,N-bis(methylene phosphonate) remained stable at ambient temperature for 6 hours when diluted with 30 gpg water. These studies confirmed the efficacy of Ethanolamine-N,N-bis(methylene phosphonate) in inhibiting scale formation in quaternary ammonium disinfectant compositions.

Example 4

The exemplary formulations tested in Examples 15-18 were also examined for their ability to inhibit or eliminate Adenovirus. The solutions were prepared as described above and a virucidal efficacy assay was performed. Adeno type 5 virus was subjected to the exemplary compositions for 5, 15, or 30 minutes.

Efficacy Evaluation Against Adenovirus Methods:
Test Method:
MS505-10: Virucidal Efficacy Assay for Hard Surfaces Agents Method Parameters:
  Test Substances: 2% in EU hard water
    1) Example 15
    2) Example 16
    3) Example 17
    4) Example 18
  Diluent: 300 PPM EU Hard Water (procedure to make EU hard water shown below)
  Test System: Adeno type 5 Virus
  Organic Soil: 5% Fetal Bovine Serum (FBS) present in viral stock
  Exposure Temperature: Ambient (20-26° C.)
  Exposure Times: 5, 15, and 30 min
  Neutralizer: Sephadex Columns
  Test Medium: EMEM
  Test Cell Cultures: HeLa Cells
  Incubation: 10 days at 35±2° C., 5±2% $CO_2$
Procedure to Make European Hard Water
  Procedure for 1000 mL artificial water with 20° total hardness and 20° temporary hardness:
    Preparation of solution A: 19.84 g magnesium chloride (MgCl2) and 46.24 calcium chloride (CaCl2) are dissolved in DI-water and diluted to 1000 mL. The solution is stored for no longer than one month in a refrigerator.
    Preparation of solution B: 35.02 g sodium hydrogen carbonate is dissolved in DI-water and diluted to 1000 mL. The solution is stored for no longer than one week in a refrigerator.
    Add 5.71 mL of solution A and 17.09 mL of solution B in a 1000 mL volumetric flask with 600 to 700 mL of DI-water. Mix and dilute to 1000 mL with DI-water. The pH-value of the artificial hard water has to be 7.0±0.2 at 20±1° C. If necessary the pH-value is adjusted with a solution of about 40 g/L (about 1 mol/L) sodium hydroxide (NaOH) or about 36.5 g/L (about 1 mol/L) hydrochloric acid (HCl).
  The artificial hard water has to be prepared freshly and used within 12 h.

TABLE 7

Formulations for Efficacy Against Adenovirus:

| | Example 15 | Example 16 | Example 17 | Example 18 |
|---|---|---|---|---|
| DI Water to 100% | | | | |
| Preventol BZT | 0.15-0.4 | 0.15-0.4 | 0.15-0.4 | 0.15-0.4 |
| Lonzabac 12.100 | 7-9 | 7-9 | 7-9 | 7-9 |
| Glucopn 650EC, 50% | 3-5 | 3-5 | 3-5 | 3-5 |
| Barquat DM50, 50% | 14-16 | 14-16 | 14-16 | 14-16 |
| Trilon M, 40% | 0.5 | 0 | 0 | 0 |
| Briquest 221-50A, 50% | 0 | 0.1 | 0.25 | 0.5 |
| Protectol PE | 9-11 | 9-11 | 9-11 | 9-11 |
| Monoethanolamine | 2 | 2 | 2 | 2 |
| | 100 | 100 | 100 | 100 |

Results:

TABLE 8

| | | 5 minutes | | | |
|---|---|---|---|---|---|
| Dilution | Virus Control | Example 15 | Example 16 | Example 17 | Example 18 |
| Cell Control | | 0 0 0 0 | 0 0 0 0 | 0 0 0 0 | 0 0 0 0 |
| $10^{-1}$ | + + + + | + + + + | + + + + | + + + + | + + + + |

TABLE 8-continued

5 minutes

| Dilution | Virus Control | Example 15 | Example 16 | Example 17 | Example 18 |
|---|---|---|---|---|---|
| $10^{-2}$ | + + + + | + + + + | + + + + | + + + + | + + + + |
| $10^{-3}$ | + + + + | + + + + | + + + + | + + + + | + + + + |
| $10^{-4}$ | + + + + | 0 0 0 0 | 0 0 0 + | 0 0 + 0 | + + 0 0 |
| $10^{-5}$ | + + + + | 0 0 0 0 | 0 0 0 0 | 0 0 0 0 | 0 0 0 0 |
| $10^{-6}$ | + + + + | | | | |
| $10^{-7}$ | + 0 0 0 | | | | |
| $TCID_{50}/0.1$ mL | 6.75 | 3.50 | 3.75 | 3.75 | 4.00 |
| $Log_{10}$ Reduction | | 3.25 | 3.00 | 3.00 | 2.75 |

0 = Negative for the presence of the test virus and/or no cytotoxicity present
+ = Virus present
T = Cytotoxicity present; the presence or absence of the test virus could not be determined

TABLE 9

15 minutes

| Dilution | Virus Control | Example 15 | Example 16 | Example 17 | Example 18 |
|---|---|---|---|---|---|
| Cell Control | | 0 0 0 0 | 0 0 0 0 | 0 0 0 0 | 0 0 0 0 |
| $10^{-1}$ | | + + + + | + + + + | + + + + | + + + + |
| $10^{-2}$ | + + + + | + + + 0 | + + + + | + + + + | 0 + + 0 |
| $10^{-3}$ | + + + + | 0 0 0 0 | 0 0 0 0 | 0 0 0 0 | 0 0 0 0 |
| $10^{-4}$ | + + + + | 0 0 0 0 | 0 0 0 0 | 0 0 0 0 | 0 0 0 0 |
| $10^{-5}$ | + + + + | 0 0 0 0 | 0 0 0 0 | 0 0 0 0 | 0 0 0 0 |
| $10^{-6}$ | + + + + | | | | |
| $10^{-7}$ | 0 0 + + | | | | |
| $TCID_{50}/0.1$ mL | 7.00 | 2.25 | 2.50 | 2.50 | 2.00 |
| $Log_{10}$ Reduction | | 4.75 | 4.50 | 4.50 | 5.00 |

TABLE 10

30 minutes

| Dilution | Virus Control | Example 15 | Example 16 | Example 17 | Example 18 |
|---|---|---|---|---|---|
| Cell Control | | 0 0 0 0 | 0 0 0 0 | 0 0 0 0 | 0 0 0 0 |
| $10^{-1}$ | | 0 0 0 0 | 0 0 0 0 | 0 0 0 0 | 0 0 0 0 |
| $10^{-2}$ | + + + + | 0 0 0 0 | 0 0 0 0 | 0 0 0 0 | 0 0 0 0 |
| $10^{-3}$ | + + + + | 0 0 0 0 | 0 0 0 0 | 0 0 0 0 | 0 0 0 0 |
| $10^{-4}$ | + + + + | 0 0 0 0 | 0 0 0 0 | 0 0 0 0 | 0 0 0 0 |
| $10^{-5}$ | + + + + | 0 0 0 0 | 0 0 0 0 | 0 0 0 0 | 0 0 0 0 |
| $10^{-6}$ | + + + + | | | | |
| $10^{-7}$ | + + 0 0 | | | | |
| $TCID_{50}/0.1$ mL | 7.00 | ≤0.50 | ≤0.50 | ≤0.50 | ≤0.50 |
| $Log_{10}$ Reduction | | ≥6.50 | ≥6.50 | ≥6.50 | ≥6.50 |

The exemplary compositions 15-18 all resulted in reduction of virus upon treatment. After 5 minutes, a log reduction about 3 was observed for all compositions. A log reduction of about 5 was observed at 15 minutes and a log reduction of 6.5 or more was observed at 30 minutes. This indicated that the compositions were effective not only for remaining clear and stable when diluted with hard water, but also retains efficacy for eliminating viral load.

Example 5

Antifungal Efficacy Against *Candida Albicans*:

Test Method: EN 13624 (December 2013), (Phase 2, step 1)
Dilution neutralization method☒ Pour plate ☐ Spread plate ☐
Number of plates . . . 1/mL

| Neutralizer: | Composition in g/L DeyEngly Broth (Difco D/E : Neutralizing Broth) | |
|---|---|---|
| | : Pancreatic Digest of Casein | 5.0 |
| | : Yeast Extract | 2.5 |
| | : Dextrose | 10.0 |
| | : Sodium Thioglycollate | 1.0 |
| | : Sodium Thiosulfate | 6.0 |
| | : Sodium Bisulfite | 2.5 |
| | : Polysorbate 80 | 5.0 |
| | : Lecithin | 7.0 |
| | : Bromcresol Purple | 0.02 |
| | : Lab Purified Water | 1000 mL |
| | Final pH 7.6 ± 0.2 | |
| Mode of sterilization: | Autoclave (121° C. for 15 minutes) | |

TABLE 10A

EXPERIMENTAL CONDITIONS:

| Period of analysis: | Jun. 10, 2015 to Jun. 12, 2015 |
|---|---|
| | Jun. 12, 2015 to Jun. 15, 2015 |
| Product diluent: | Synthetic hard water (330 mg/L as CaCO3) |
| Product test concentrations: | 0.1% and 0.25% |
| Appearance of the product test solution: | Liquid, clear |
| Contact times: | 15 & 35 minutes |
| Test temperature: | Ambient (ave. 20.0° C.) |
| Interfering substances: | 0.3 g/L bovine albumin = clean conditions |
| | 3.0 g/L bovine albumin + 3.0 mL/L sheep erythrocytes = dirty conditions |
| Stability and appearance of the mixture: | Liquid, clear |
| Incubation temperature: | 30° C. ± 2° C. |
| Neutralizer: | Dey Engley Broth |
| Test organism: | *Candida albicans* ATCC 10231 (test suspension was prepared from 2nd transfer on Oxoid MEA (1st from stock slant @ 2-8° C.)) |

Test Results: Validation of Neutralization—Neutralization Method

TABLE 11

Neutralization Validation

| Test Organism | Neutralization Validation Fungal Test Suspension (see 5.4.1.5) | Experimental Conditions (A see 5.5.2.3) | Neutralizer Toxicity Control (B see 5.5.2.4) | Dilution Neutralization Control (C see 5.5.2.5) |
|---|---|---|---|---|
| *Candida albicans* | $V_c$: 147, 125<br>$N_V$: 1.36 × $10^3$ | (Clean)<br>$V_c$: 142, 137 | $V_c$: 118, 120<br>B: 119 | (Clean)<br>(Example 15) |

TABLE 11-continued

Neutralization Validation

| | | | | |
|---|---|---|---|---|
| ATCC 10231 | $N_{V0}$: 136 | A: 140 | | $V_c$: 128, 137 |
| | 0.5 $N_{V0}$: 68 | | | C: 133 |
| Candida | $N_{VB}$: 1.38 × 10$^5$ | (Dirty) | $V_c$: 118, 120 | (Dirty) |
| albicans | 0.0005 $N_{VB}$: 69 | $V_c$: 153, 131 | B: 119 | (Example 15) |
| ATCC 10231 | | A: 142 | | $V_c$: 138, 145 |
| | | | | C: 142 |
| Candida | $V_c$: 147, 125 | (Clean) | $V_c$: 118, 120 | (Clean) |
| albicans | $N_V$: 1.36 × 10$^3$ | $V_c$: 142, 137 | B: 119 | (Example 18) |
| ATCC 10231 | $N_{V0}$: 136 | A: 140 | | $V_c$: 101, 121 |
| | 0.5 $N_{V0}$: 68 | | | C: 111 |
| Candida | $N_{VB}$: 1.38 × 10$^5$ | (Dirty) | $V_c$: 118, 120 | (Dirty) |
| albicans | 0.0005 $N_{VB}$: 69 | $V_c$: 153, 131 | B: 119 | (Example 18) |
| ATCC 10231 | | A: 142 | | $V_c$: 142, 147 |
| | | | | C: 145 |

$V_c$ = viable count
$N_v$ = cfu/mL of the neutralization validation fungal suspension
A = cfu/mL of the experimental condition validation
B = cfu/mL of the neutralizer toxicity validation
C = cfu/mL of the dilution-neutralization test control The dilution-neutralization method is validated if:
$N_{V0}$ is between 30 and 160
$N_V$ is between $3.0 \times 10^2$ cfu/mL and $1.6 \times 10^3$ cfu/mL
$N_{VB}$ is between $3.0 \times 10^4$ cfu/mL and $1.6 \times 10^5$ cfu/mL
A is ≥0.5 $N_{V0}$
B is ≥0.0005 $N_{VB}$
C is ≥0.5 $N_{V0}$ The dilution-neutralization is validated with the tested neutralizer for the product test concentration of 0.25% for test organism *C. albicans*, with 15 minute exposure time, at 20° C.

TABLE 12

Example 15

| Test Organism | Fungal Test Suspension (see 5.4.1.4) | Test procedure at Example 15 Inline concentration (0.1%) (5.5.2.2) | Average of Replicates |
|---|---|---|---|
| Candida albicans ATCC 10231 | $V_c$ 10$^{-5}$: 478, 503<br>$V_c$ 10$^{-6}$: 60, 55<br>N: 5.8 × 10$^7$ | 15 min (Clean conditions) Rep 1<br>$V_c$: 57, 71 (0);<br>4, 7 (−1) (<14, <14)<br>$N_a^0$: 6.4 × 10$^2$<br>$N_a^{-1}$: <1400 | R: 4.17 |
| Candida albicans ATCC 10231 | $V_c$ 10$^{-5}$: 478, 503<br>$V_c$ 10$^{-6}$: 60, 55<br>N: 5.8 × 10$^7$ | 15 min (Clean conditions) Rep 2<br>$V_c$: 0, 0 (0) (<14, <14);<br>0, 0 (−1) (<14, <14)<br>$N_a^0$: <140<br>$N_a^{-1}$: <1400 | |
| Candida albicans ATCC 10231 | $V_c$ 10$^{-5}$: 478, 503<br>$V_c$ 10$^{-6}$: 60, 55<br>N: 5.8 × 10$^7$ | 35 min (Clean conditions) Rep 1<br>$V_c$: 6, 4 (0) (<14. <14);<br>0, 1 (−1) (<14, <14)<br>$N_a^0$: <140<br>$N_a^{-1}$: <1400 | R: 4.61 |
| Candida albicans ATCC 10231 | $V_c$ 10$^{-5}$: 478, 503<br>$V_c$ 10$^{-6}$: 60, 55<br>N: 5.8 × 10$^7$ | 35 min (Clean conditions) Rep 2<br>$V_c$: 5, 2 (0) (<14. <14);<br>1, 0 (−1) (<14, <14)<br>$N_a^0$: <140<br>$N_a^{-1}$: <1400 | |
| Candida albicans ATCC 10231 | $V_c$ 10$^{-5}$: 478, 503<br>$V_c$ 10$^{-6}$: 60, 55<br>N: 5.8 × 10$^7$ | 15 min (Dirty conditions) Rep 1<br>$V_c$: >330, >330 (0);<br>>330, >330 (−1)<br>$N_a^0$: >3.3 × 10$^3$<br>$N_a^{-1}$: >3.3 × 10$^4$ | R: 2.24 |
| Candida albicans ATCC 10231 | $V_c$ 10$^{-5}$: 478, 503<br>$V_c$ 10$^{-6}$: 60, 55<br>N: 5.8 × 10$^7$ | 15 min (Dirty conditions) Rep 2<br>$V_c$: >330, >330 (0);<br>>330, >330 (−1)<br>$N_a^0$: >3.3 × 10$^3$<br>$N_a^{-1}$: >3.3 × 10$^4$ | |
| Candida albicans ATCC 10231 | $V_c$ 10$^{-5}$: 478, 503<br>$V_c$ 10$^{-6}$: 60, 55<br>N: 5.8 × 10$^7$ | 35 min (Dirty conditions) Rep 1<br>$V_c$: >330, >330 (0);<br>79, 102 (−1)<br>$N_a^0$: >3.3 × 10$^3$<br>$N_a^{-1}$: 9.1 × 10$^3$ | R: 2.84 |
| Candida albicans ATCC 10231 | $V_c$ 10$^{-5}$: 478, 503<br>$V_c$ 10$^{-6}$: 60, 55<br>N: 5.8 × 10$^7$ | 35 min (Dirty conditions) Rep 2<br>$V_c$: >330, >330 (0);<br>77, 71 (−1)<br>$N_a^0$: >3.3 × 10$^3$<br>$N_a^{-1}$: 7.4 × 10$^3$ | |

$V_c$ = viable count
N = cfu/mL of the fungal test suspension (see 5.5.1.4)
$N_a$ = cfu/mL in the test mixture (see 5.5.2.2.3)
R = reduction in viability (see 5.6.3)

Test Criteria:
N is between $1.5 \times 10^7$ cfu/mL and $5 \times 10^7$ cfu/mL*
R must be ≥10$^4$ to demonstrate fungicidal activity for the tested organism at the product test concentration

TABLE 13

Example 16

| Test Organism | Fungal Test Suspension (see 5.4.1.4) | Test procedure at Incidin Pro with 0.1% Briquest 221-50A (Example 16) concentration (0.1%) (5.5.2.2) | Average of Replicates |
|---|---|---|---|
| Candida albicans ATCC 10231 | $V_c$ 10$^{-5}$: 478, 503<br>$V_c$ 10$^{-6}$: 60, 55<br>N: 5.8 × 10$^7$ | 15 min (Clean conditions) Rep 1<br>$V_c$: 0, 0 (0) (<14, <14);<br>0, 0 (−1) (<14, <14)<br>$N_a^0$: <140<br>$N_a^{-1}$: <1400 | R: 4.61 |
| Candida albicans ATCC 10231 | $V_c$ 10$^{-5}$: 478, 503<br>$V_c$ 10$^{-6}$: 60, 55<br>N: 5.8 × 10$^7$ | 15 min (Clean conditions) Rep 2<br>$V_c$: 0, 0 (0) (<14, <14);<br>0, 0 (−1) (<14, <14)<br>$N_a^0$: <140<br>$N_a^{-1}$: <1400 | |
| Candida albicans ATCC 10231 | $V_c$ 10$^{-5}$: 478, 503<br>$V_c$ 10$^{-6}$: 60, 55<br>N: 5.8 × 10$^7$ | 35 min (Clean conditions) Rep 1<br>$V_c$: 0, 0 (0) (<14. <14);<br>0, 0 (−1) (<14, <14)<br>$N_a^0$: <140<br>$N_a^{-1}$: <1400 | R: 4.61 |
| Candida albicans ATCC | $V_c$ 10$^{-5}$: 478, 503<br>$V_c$ 10$^{-6}$: 60, 55 | 35 min (Clean conditions) Rep 2<br>$V_c$: 12, 10 (0) (<14. <14);<br>0, 0 (−1) (<14, <14) | |

TABLE 13-continued

Example 16

| | | | |
|---|---|---|---|
| 10231 | N: 5.8 × 10$^7$ | N$_a^0$: <140<br>Na$^{-1}$: <1400 | |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 15 min (Dirty conditions) Rep 1<br>V$_c$: >330, >330 (0);<br>>330, >330 (−1)<br>N$_a^0$: >3.3 × 10$^3$<br>Na$^{-1}$: >3.3 × 10$^4$ | R: 2.26 |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 15 min (Dirty conditions) Rep 2<br>V$_c$: >330, >330 (0);<br>316, 294 (−1):<br>N$_a^0$: >3.3 × 10$^3$<br>Na$^{-1}$: 3.1 × 10$^4$ | |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 35 min (Dirty conditions) Rep 1<br>V$_c$: >330, >330 (0);<br>96, 83 (−1)<br>N$_a^0$: >3.3 × 10$^3$<br>Na$^{-1}$: 9.0 × 10$^3$ | R: 2.85 |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 35 min (Dirty conditions) Rep 2<br>V$_c$: >330, >330 (0);<br>68, 81 (−1)<br>N$_a^0$: >3.3 × 10$^3$<br>Na$^{-1}$: 7.5 × 10$^3$ | |

V$_c$ = viable count
N = cfu/mL of the fungal test suspension (see 5.5.1.4)
N$_a$ = cfu/mL in the test mixture (see 5.5.2.2.3)
R = reduction in viability (see 5.6.3)

Test Criteria:
N is between 1.5 × 10$^7$ cfu/mL and 5 × 10$^7$ cfu/mL*
R must be ≥10$^4$ to demonstrate fungicidal activity for the tested organism at the product test concentration

TABLE 14

Example 17

| Test<br>Organism | Fungal Test<br>Suspension<br>(see 5.4.1.4) | Test procedure at Incidin Pro<br>with 0.25% Briquest 221-50A<br>(Example 17) concentration<br>(0.1%) (5.5.2.2) | Average<br>of<br>Replicates |
|---|---|---|---|
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 15 min (Clean conditions) Rep 1<br>V$_c$: 2, 6 (0) (<14, <14);<br>4, 2 (−1) (<14, <14)<br>N$_a^0$: <140<br>Na$^{-1}$: <1400 | R: 3.88 |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 15 min (Clean conditions) Rep 2<br>V$_c$: 121, 152 (0);<br>14, 7 (−1) (14, <14)<br>N$_a^0$: 1.4 × 10$^3$<br>Na$^{-1}$: <1400 | |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 35 min (Clean conditions) Rep 1<br>V$_c$: 0, 0 (0) (<14. <14);<br>0, 0 (−1) (<14, <14)<br>N$_a^0$: <140<br>Na$^{-1}$: <1400 | R: 4.61 |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 35 min (Clean conditions) Rep 2<br>V$_c$: 1, 1 (0) (<14. <14);<br>0, 0 (−1) (<14, <14)<br>N$_a^0$: <140<br>Na$^{-1}$: <1400 | |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 15 min (Dirty conditions) Rep 1<br>V$_c$: >330, >330 (0);<br>>330, >330 (−1)<br>N$_a^0$: >3.3 × 10$^3$<br>Na$^{-1}$: >3.3 × 10$^4$ | R: 2.24 |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 15 min (Dirty conditions) Rep 2<br>V$_c$: >330, >330 (0);<br>>330, >330 (−1)<br>N$_a^0$: >3.3 × 10$^3$<br>Na$^{-1}$: >3.3 × 10$^4$ | |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 35 min (Dirty conditions) Rep 1<br>V$_c$: >330, >330 (0);<br>155, 183 (−1)<br>N$_a^0$: >3.3 × 10$^3$<br>Na$^{-1}$: 1.7 × 10$^4$ | R: 2.64 |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 35 min (Dirty conditions) Rep 2<br>V$_c$: >330, >330 (0);<br>93, 97 (−1)<br>N$_a^0$: >3.3 × 10$^3$<br>Na$^{-1}$: 9.5 × 10$^3$ | |

V$_c$ = viable count
N = cfu/mL of the fungal test suspension (see 5.5.1.4)
N$_a$ = cfu/mL in the test mixture (see 5.5.2.2.3)
R = reduction in viability (see 5.6.3)

Test Criteria:
N is between 1.5 × 10$^7$ cfu/mL and 5 × 10$^7$ cfu/mL
*R must be ≥10$^4$ to demonstrate fungicidal activity for the tested organism at the product test concentration

TABLE 15

Example 18

| Test<br>Organism | Fungal Test<br>Suspension<br>(see 5.4.1.4) | Test procedure<br>at Incidin Pro with 0.5%<br>Briquest 221-50A (Example 18)<br>concentration (0.1%)<br>(5.5.2.2) | Average<br>of<br>Replicates |
|---|---|---|---|
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 15 min (Clean conditions) Rep 1<br>V$_c$: 9, 9 (0) (<14, <14);<br>0, 1 (−1) (<14, <14)<br>N$_a^0$: <140<br>Na$^{-1}$: <1400 | R: 3.72 |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 15 min (Clean conditions) Rep 2<br>V$_c$: >330, 54 (0); (330, 54)<br>58, 11 (−1) (58, <14)<br>N$_a$: 2.1 × 10$^3$ | |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 35 min (Clean conditions) Rep 1<br>V$_c$: 0, 0 (0) (<14. <14);<br>0, 0 (−1) (<14. <14)<br>N$_a^0$: <140<br>Na$^{-1}$: <1400 | R: 4.61 |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 35 min (Clean conditions) Rep 2<br>V$_c$: 13, 11 (0) (<14. <14);<br>1, 1 (−1) (<14, <14)<br>N$_a^0$: <140<br>Na$^{-1}$: <1400 | |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 15 min (Dirty conditions) Rep 1<br>V$_c$: >330, >330 (0);<br>>330, >330 (−1)<br>N$_a^0$: >3.3 × 10$^3$<br>Na$^{-1}$: >3.3 × 10$^4$ | R: 2.24 |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 15 min (Dirty conditions) Rep 2<br>V$_c$: >330, >330 (0);<br>>330, >330 (−1)<br>N$_a^0$: >3.3 × 10$^3$<br>Na$^{-1}$: >3.3 × 10$^4$ | |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 35 min (Dirty conditions) Rep 1<br>V$_c$: >330, >330 (0);<br>247, 299 (−1)<br>N$_a^0$: >3.3 × 10$^3$<br>Na$^{-1}$: 2.7 × 10$^4$ | R: 2.29 |
| Candida<br>albicans<br>ATCC<br>10231 | V$_c$ 10$^{-5}$: 478,<br>503<br>V$_c$ 10$^{-6}$: 60, 55<br>N: 5.8 × 10$^7$ | 35 min (Dirty conditions) Rep 2<br>V$_c$: >330, >330 (0);<br>>330, 313 (−1)<br>N$_a^0$: >3.3 × 10$^3$<br>Na$^{-1}$: 3.2 × 10$^4$ | |

V$_c$ = viable count
N = cfu/mL of the fungal test suspension (see 5.5.1.4)
N$_a$ = cfu/mL in the test mixture (see 5.5.2.2.3)
R = reduction in viability (see 5.6.3)

Test Criteria:
N is between 1.5 × 10$^7$ cfu/mL and 5 × 10$^7$ cfu/mL*
R must be ≥10$^4$ to demonstrate fungicidal activity for the tested organism at the product test concentration

TABLE 16

Example 15

| Test Organism | Fungal Test Suspension (see 5.4.1.4) | Test procedure at Example 15 concentration (0.25%) (5.5.2.2) | Average of Replicates |
|---|---|---|---|
| Candida albicans ATCC 10231 | $V_c$ $10^{-5}$: 388, 439 $V_c$ $10^{-6}$: 45, 52 N: $4.9 \times 10^7$ | 15 min (Clean conditions) Rep 1 $V_c$: 0, 0 (0); 0, 0 (−1) (<14, <14) $N_a^0$: <140 $N_a^{-1}$: <1400 | R: 4.54 |
| Candida albicans ATCC 10231 | $V_c$ $10^{-5}$: 388, 439 $V_c$ $10^{-6}$: 45, 52 N: $4.9 \times 10^7$ | 15 min (Clean conditions) Rep 2 $V_c$: 0, 0 (0); 0, 0 (−1) (<14, <14) $N_a^0$: <140 $N_a^{-1}$: <1400 | |
| Candida albicans ATCC 10231 | $V_c$ $10^{-5}$: 388, 439 $V_c$ $10^{-6}$: 45, 52 N: $4.9 \times 10^7$ | 35 min (Clean conditions) Rep 1 $V_c$: 53, 53 (0); 2, 3 (−1) (<14, <14) $N_a^0$: $5.3 \times 10^2$ $N_a^{-1}$: <1400 | R: 4.16 |
| Candida albicans ATCC 10231 | $V_c$ $10^{-5}$: 388, 439 $V_c$ $10^{-6}$: 45, 52 N: $4.9 \times 10^7$ | 35 min (Clean conditions) Rep 2 $V_c$: 0, 0 (0); (<14, <14); 0, 0 (−1) (<14, <14) $N_a^0$: <140 $N_a^{-1}$: <1400 | |
| Candida albicans ATCC 10231 | $V_c$ $10^{-5}$: 388, 439 $V_c$ $10^{-6}$: 45, 52 N: $4.9 \times 10^7$ | 15 min (Dirty conditions) Rep 1 $V_c$: 18, 9 (0) (18, <14); 2, 3 (−1) (<14, <14) $N_a^0$: $<1.6 \times 10^2$ $N_a^{-1}$: <1400 | R: 4.51 |
| Candida albicans ATCC 10231 | $V_c$ $10^{-5}$: 388, 439 $V_c$ $10^{-6}$: 45, 52 N: $4.9 \times 10^7$ | 15 min (Dirty conditions) Rep 2 $V_c$: 0, 0 (0); 0, 0 (−1) (<14, <14) $N_a^0$: <140 $N_a^{-1}$: <1400 | |
| Candida albicans ATCC 10231 | $V_c$ $10^{-5}$: 388, 439 $V_c$ $10^{-6}$: 45, 52 N: $4.9 \times 10^7$ | 35 min (Dirty conditions) Rep 1 $V_c$: 0, 0 (0); 0, 0 (−1) (<14, <14) $N_a^0$: <140 $N_a^{-1}$: <1400 | R: 4.54 |
| Candida albicans ATCC 10231 | $V_c$ $10^{-5}$: 388, 439 $V_c$ $10^{-6}$: 45, 52 N: $4.9 \times 10^7$ | 35 min (Dirty conditions) Rep 2 $V_c$: 0, 0 (0); 0, 0 (−1) (<14, <14) $N_a^0$: <140 $N_a^{-1}$: <1400 | |

$V_c$ = viable count
N = cfu/mL of the fungal test suspension (see 5.5.1.4)
$N_a$ = cfu/mL in the test mixture (see 5.5.2.2.3)
R = reduction in viability (see 5.6.3)

Test Criteria:
N is between $1.5 \times 10^7$ cfu/mL and $5 \times 10^7$ cfu/mL
R must be $\geq 10^4$ to demonstrate fungicidal activity for the tested organism at the product test concentration

TABLE 17

Example 16

| Test Organism | Fungal Test Suspension (see 5.4.1.4) | Test procedure at Incidin Pro with 0.1% Briquest 221-50A (example 16) concentration (0.25%) (5.5.2.2) | Average of Replicates |
|---|---|---|---|
| Candida albicans ATCC 10231 | $V_c$ $10^{-5}$: 388, 439 $V_c$ $10^{-6}$: 45, 52 N: $4.9 \times 10^7$ | 15 min (Clean conditions) Rep 1 $V_c$: 0, 0 (0); 0, 0 (−1) (<14, <14) $N_a^0$: <140 $N_a^{-1}$: <1400 | R: 4.54 |
| Candida albicans ATCC 10231 | $V_c$ $10^{-5}$: 388, 439 $V_c$ $10^{-6}$: 45, 52 N: $4.9 \times 10^7$ | 15 min (Clean conditions) Rep 2 $V_c$: 0, 1 (0); 0, 0 (−1) (<14, <14) $N_a^0$: <140 $N_a^{-1}$: <1400 | |
| Candida albicans ATCC 10231 | $V_c$ $10^{-5}$: 388, 439 $V_c$ $10^{-6}$: 45, 52 N: $4.9 \times 10^7$ | 35 min (Clean conditions) Rep 1 $V_c$: 0, 0 (0) (<14, <14); 0, 0 (−1) (<14, <14) $N_a^0$: <140 $N_a^{-1}$: <1400 | R: 4.54 |
| Candida albicans ATCC 10231 | $V_c$ $10^{-5}$: 388, 439 $V_c$ $10^{-6}$: 45, 52 N: $4.9 \times 10^7$ | 35 min (Clean conditions) Rep 2 $V_c$: 0, 0 (0) (<14, <14); 0, 0 (−1) (<14, <14) $N_a^0$: <140 $N_a^{-1}$: <1400 | |
| Candida albicans ATCC 10231 | $V_c$ $10^{-5}$: 388, 439 $V_c$ $10^{-6}$: 45, 52 N: $4.9 \times 10^7$ | 15 min (Dirty conditions) Rep 1 $V_c$: 0, 1 (0) (<14, <14); 0, 0 (−1) (<14, <14) $N_a^0$: <140 $N_a^{-1}$: <1400 | R: 4.54 |
| Candida albicans ATCC 10231 | $V_c$ $10^{-5}$: 388, 439 $V_c$ $10^{-6}$: 45, 52 N: $4.9 \times 10^7$ | 15 min (Dirty conditions) Rep 2 $V_c$: 0, 1 (0) (<14, <14); 1, 9 (−1) (<14, <14) $N_a^0$: <140 $N_a^{-1}$: <1400 | |
| Candida albicans ATCC 10231 | $V_c$ $10^{-5}$: 388, 439 $V_c$ $10^{-6}$: 45, 52 N: $4.9 \times 10^7$ | 35 min (Dirty conditions) Rep 1 $V_c$: 2, 1 (0) (<14, <14); 0, 0 (−1) (<14, <14) $N_a^0$: <140 $N_a^{-1}$: <1400 | R: 4.54 |
| Candida albicans ATCC 10231 | $V_c$ $10^{-5}$: 388, 439 $V_c$ $10^{-6}$: 45, 52 N: $4.9 \times 10^7$ | 35 min (Dirty conditions) Rep 2 $V_c$: 0, 0 (0) (<14, <14); 0, 0 (−1) (<14, <14) $N_a^0$: <140 $N_a^{-1}$: <1400 | |

$V_c$ = viable count
N = cfu/mL of the fungal test suspension (see 5.5.1.4)
$N_a$ = cfu/mL in the test mixture (see 5.5.2.2.3)
R = reduction in viability (see 5.6.3)

Test Criteria:
N is between $1.5 \times 10^7$ cfu/mL and $5 \times 10^7$ cfu/mL
R must be $\geq 10^4$ to demonstrate fungicidal activity for the tested organism at the product test concentration

TABLE 18

Example 17

| Test Organism | Fungal Test Suspension (see 5.4.1.4) | Test procedure at Incidin Pro with 0.25% Briquest 221-50A (Example 17) concentration (0.25%) (5.5.2.2) | Average of Replicates |
|---|---|---|---|
| Candida albicans ATCC 10231 | $V_c$ $10^{-5}$: 388, 439 $V_c$ $10^{-6}$: 45, 52 N: $4.9 \times 10^7$ | 15 min (Clean conditions) Rep 1 $V_c$: 1, 0 (0) (<14, <14); 0, 0 (−1) (<14, <14) $N_a^0$: <140 $N_a^{-1}$: <1400 | R: 4.41 |
| Candida albicans ATCC 10231 | $V_c$ $10^{-5}$: 388, 439 $V_c$ $10^{-6}$: 45, 52 N: $4.9 \times 10^7$ | 15 min (Clean conditions) Rep 2 $V_c$: 21, 26 (0); 8, 126 (−1) (<14, 126) $N_a^0$: $2.4 \times 10^2$ $N_a^{-1}$: <7000 | |
| Candida albicans ATCC 10231 | $V_c$ $10^{-5}$: 388, 439 $V_c$ $10^{-6}$: 45, 52 N: $4.9 \times 10^7$ | 35 min (Clean conditions) Rep 1 $V_c$: 0, 0 (0) (<14, <14); 0, 0 (−1) (<14, <14) $N_a^0$: <140 $N_a^{-1}$: <1400 | R: 4.54 |
| Candida albicans ATCC 10231 | $V_c$ $10^{-5}$: 388, 439 $V_c$ $10^{-6}$: 45, 52 N: $4.9 \times 10^7$ | 35 min (Clean conditions) Rep 2 $V_c$: 0, 0 (0) (<14, <14); 0, 0 (−1) (<14, <14) $N_a^0$: <140 $N_a^{-1}$: <1400 | |
| Candida albicans ATCC 10231 | $V_c$ $10^{-5}$: 388, 439 $V_c$ $10^{-6}$: 45, 52 N: $4.9 \times 10^7$ | 15 min (Dirty conditions) Rep 1 $V_c$: 94, 83 (0); 6, 11 (−1) (<14, <14) $N_a^0$: $8.9 \times 10^2$ $N_a^{-1}$: <1400 | R: 3.96 |
| Candida albicans ATCC | $V_c$ $10^{-5}$: 388, 439 $V_c$ $10^{-6}$: 45, 52 | 15 min (Dirty conditions) Rep 2 $V_c$: 22, 11 (0) (22, <14); 3, 1 (−1) (<14, <14) | |

TABLE 18-continued

Example 17

| | | | |
|---|---|---|---|
| 10231 | N: 4.9 × 10$^7$ | N$_a^0$: 1.8 × 10$^2$ | |
| | | Na$^{-1}$: <1400 | |
| Candida | V$_c$ 10$^{-5}$: 388, | 35 min (Dirty conditions) Rep 1 | R: 4.54 |
| albicans | 439 | V$_c$: 1, 1 (0) (<14, <14); | |
| ATCC | V$_c$ 10$^{-6}$: 45, 52 | 0 (−1) (<14, <14) | |
| 10231 | N: 4.9 × 10$^7$ | N$_a^0$: <140 | |
| | | Na$^{-1}$: <1400 | |
| Candida | V$_c$ 10$^{-5}$: 388, | 35 min (Dirty conditions) Rep 2 | |
| albicans | 439 | V$_c$: 0, 0 (0) (<14, <14); | |
| ATCC | V$_c$ 10$^{-6}$: 45, 52 | 0, 0 (−1) (<14, <14) | |
| 10231 | N: 4.9 × 10$^7$ | N$_a^0$: <140 | |
| | | Na$^{-1}$: <1400 | |

V$_c$ = viable count
N = cfu/mL of the fungal test suspension (see 5.5.1.4)
N$_a$ = cfu/mL in the test mixture (see 5.5.2.2.3)
R = reduction in viability (see 5.6.3)

Test Criteria:
N is between 1.5 × 10$^7$ cfu/mL and 5 × 10$^7$ cfu/mL
R must be ≥10$^4$ to demonstrate fungicidal activity for the tested organism at the product test concentration

TABLE 19

Example 18

| Test Organism | Fungal Test Suspension (see 5.4.1.4) | Test procedure at Incidin Pro with 0.5% Briquest 221-50A (Example 18) concentration (0.25%) (5.5.2.2) | Average of Replicates |
|---|---|---|---|
| Candida | V$_c$ 10$^{-5}$: 388, | 15 min (Clean conditions) Rep 1 | R: 4.54 |
| albicans | 439 | V$_c$: 0, 0 (0) (<14, <14); | |
| ATCC | V$_c$ 10$^{-6}$: 45, 52 | 0, 0 (−1) (<14, <14) | |
| 10231 | N: 4.9 × 10$^7$ | N$_a^0$: <140 | |
| | | Na$^{-1}$: <1400 | |
| Candida | V$_c$ 10$^{-5}$: 388, | 15 min (Clean conditions) Rep 2 | |
| albicans | 439 | V$_c$: 0, 0 (0) (<14, <14); | |
| ATCC | V$_c$ 10$^{-6}$: 45, 52 | 0, 0 (−1) (<14, <14) | |
| 10231 | N: 4.9 × 10$^7$ | N$_a^0$: <140 | |
| | | Na$^{-1}$: <1400 | |
| Candida | V$_c$ 10$^{-5}$: 388, | 35 min (Clean conditions) Rep 1 | R: 4.54 |
| albicans | 439 | V$_c$: 0, 0 (0) (<14. <14); | |
| ATCC | V$_c$ 10$^{-6}$: 45, 52 | 0, 0 (−1) (<14, <14) | |
| 10231 | N: 4.9 × 10$^7$ | N$_a^0$: <140 | |
| | | Na$^{-1}$: <1400 | |
| Candida | V$_c$ 10$^{-5}$: 388, | 35 min (Clean conditions) Rep 2 | |
| albicans | 439 | V$_c$: 0, 0 (0) (<14. <14); | |
| ATCC | V$_c$ 10$^{-6}$: 45, 52 | 0, 0 (−1) (<14, <14) | |
| 10231 | N: 4.9 × 10$^7$ | N$_a^0$: <140 | |
| | | Na$^{-1}$: <1400 | |
| Candida | V$_c$ 10$^{-5}$: 388, | 15 min (Dirty conditions) Rep 1 | R: 4.54 |
| albicans | 439 | V$_c$: 0, 0 (0) (<14, <14); | |
| ATCC | V$_c$ 10$^{-6}$: 45, 52 | 0, 0 (−1) (<14, <14) | |
| 10231 | N: 4.9 × 10$^7$ | N$_a^0$: <140 | |
| | | Na$^{-1}$: <1400 | |
| Candida | V$_c$ 10$^{-5}$: 388, | 15 min (Dirty conditions) Rep 2 | |
| albicans | 439 | V$_c$: 0, 0 (0) (<14, <14); | |
| ATCC | V$_c$ 10$^{-6}$: 45, 52 | 0, 0 (−1) (<14, <14) | |
| 10231 | N: 4.9 × 10$^7$ | N$_a^0$: <140 | |
| | | N$_a^{-1}$: <1400 | |
| Candida | V$_c$ 10$^{-5}$: 388, | 35 min (Dirty conditions) Rep 1 | R: 4.54 |
| albicans | 439 | V$_c$: 1, 1 (0) (<14, <14); | |
| ATCC | V$_c$ 10$^{-6}$: 45, 52 | 0 0 (−1) (<14, <14) | |
| 10231 | N: 4.9 × 10$^7$ | N$_a^0$: <140 | |
| | | Na$^{-1}$: <1400 | |
| Candida | V$_c$ 10$^{-5}$: 388, | 35 min (Dirty conditions) Rep 2 | |
| albicans | 439 | V$_c$: 0, 0 (0) (<14, <14); | |
| ATCC | V$_c$ 10$^{-6}$: 45, 52 | 0 0 (−1) (<14, <14) | |
| 10231 | N: 4.9 × 10$^7$ | N$_a^0$: <140 | |
| | | Na$^{-1}$: <1400 | |

V$_c$ = viable count
N = cfu/mL of the fungal test suspension (see 5.5.1.4)
N$_a$ = cfu/mL in the test mixture (see 5.5.2.2.3)
R = reduction in viability (see 5.6.3)

Test Criteria:
N is between 1.5 × 10$^7$ cfu/mL and 5 × 10$^7$ cfu/mL
R must be ≥10$^4$ to demonstrate fungicidal activity for the tested organism at the product test concentration

CONCLUSIONS

Existing commercially available quaternary ammonium chloride based disinfectants and the disinfecting composition of the present invention with 0.1% Briquest 221-50A (Example 16) at test concentration 0.1% demonstrated EN 13697 (December 2013) yeasticidal activity against *Candida albicans* ATCC 10231 at 15 and 35 minutes exposure time when diluted in hard water and tested at ambient temperature under clean conditions (0.3 g/L bovine albumin fraction V).

Existing commercially available quaternary ammonium chloride based disinfectants with 0.25% Briquest 221-50A (Example 17) and the disinfecting composition of the present invention with 0.5% Briquest 221-50A (Example 18) at test concentration 0.1% failed to demonstrate EN 13697 (December 2013) yeasticidal activity against *Candida albicans* ATCC 10231 at 15 minutes exposure time when diluted in hard water and tested at ambient temperature under clean conditions (0.3 g/L bovine albumin fraction V).

Existing commercially available quaternary ammonium chloride based disinfectants with 0.25% Briquest 221-50A (Example 17) and the disinfecting composition of the present invention with 0.5% Briquest 221-50A (Example 18) at test concentration 0.1% demonstrated EN 13697 (December 2013) yeasticidal activity against *Candida albicans* ATCC 10231 at 35 minutes exposure time when diluted in hard water and tested at ambient temperature under clean conditions (0.3 g/L bovine albumin fraction V).

Existing commercially available quaternary ammonium chloride based disinfectants, the disinfecting composition of the present invention with 0.1% Briquest 221-50A (Example 16), existing commercially available quaternary ammonium chloride based disinfectants with 0.25% Briquest 221-50A (Example 17) and existing commercially available quaternary ammonium chloride based disinfectants with 0.5% Briquest 221-50A (Example 18) at test concentration 0.1% failed to demonstrate EN 13697 (December 2013) yeasticidal activity against *Candida albicans* ATCC 10231 at 15 and 35 minutes exposure time when diluted in hard water and tested at ambient temperature under dirty conditions (3.0 g/L bovine albumin+3 ml/L sheep erythrocytes).

Existing commercially available quaternary ammonium chloride based disinfectants, the disinfectant composition of the present invention with 0.1% Briquest 221-50A (Example 16) and existing commercially available quaternary ammonium chloride based disinfectants with 0.5% Briquest 221-50A (Example 18) at test concentration 0.25% demonstrated EN 13697 (December 2013) yeasticidal activity against *Candida albicans* ATCC 10231 at 15 and 35 minutes exposure time when diluted in hard water and tested at ambient temperature under clean (0.3 g/L bovine albumin fraction V) and dirty conditions (3.0 g/L bovine albumin+3 ml/L sheep erythrocytes).

Existing commercially available quaternary ammonium chloride based disinfectants with 0.25% Briquest 221-50A (Example 17) at test concentration 0.25% demonstrated EN 13697 (December 2013) yeasticidal activity against *Can-* dida albicans ATCC 10231 at 15 and 35 minutes exposure time when diluted in hard water and tested at ambient temperature under clean conditions (0.3 g/L bovine albumin fraction V).

Existing commercially available quaternary ammonium chloride based disinfectants with 0.25% Briquest 221-50A (Example 17) at test concentration 0.25% demonstrated EN 13697 (December 2013) yeasticidal activity against Candida albicans ATCC 10231 at 35 minutes exposure time when diluted in hard water and tested at ambient temperature under dirty conditions (3.0 g/L bovine albumin+3 ml/L sheep erythrocytes), but failed to demonstrate yeasticidal activity at 15 minutes exposure time under the same test conditions.

Note: N was slightly above the $1.5 \times 10^7$ cfu/mL and $5 \times 10^7$ cfu/mL range for the 0.1% concentration test unless the Vc levels that were above the counting range were included in the calculations. If all four Vc values were used N was $4.98 \times 10^7$ instead of $5.8 \times 10^7$.

The yeasticidal activity of the compositions of examples 16-18 varied depending on concentration of Briquest 221-50A and the length of time that the compositions were in contact with Candida albicans. Some compositions were not effective at 15 minutes of contact time, but were effective at 35 minutes. Some compositions were effective in clean water, but not in dirty water. Overall, quaternary ammonium compounds comprising ethanolamine-N,N-bis(methylene phosphonate) are effective against Candida albicans at low concentrations when diluted with hard water.

What is claimed is:

1. A disinfectant cleaner composition comprising:
   at least one biocidal quaternary ammonium compound;
   at least one antimicrobial amine; and
   from about 0.1 wt.-% to about 2 wt.-% an anionic scale inhibitor comprising ethanolamine-N,N-bis(methylene phosphonate).

2. The disinfectant cleaner composition of claim 1, wherein the at least one biocidal quaternary ammonium compound is a quaternary ammonium chloride.

3. The disinfectant cleaner composition of claim 1, wherein the at least one biocidal quaternary ammonium compound is an alkyl ammonium chloride.

4. The disinfectant cleaner composition of claim 1, wherein the quaternary ammonium chloride is N-alkyl dimethyl benzyl ammonium.

5. The disinfectant cleaner composition of claim 4, wherein the alkyl of the quaternary ammonium chloride of N-alkyl dimethyl benzyl ammonium chloride has from about 8 to about 18 carbon atoms.

6. The disinfectant cleaner composition of claim 5, further comprising a second quaternary ammonium compound.

7. The disinfectant cleaner composition of claim 1, wherein the at least one antimicrobial amine is an aliphatic amine salt, a diamines, N-coco-1,3-propylene diamine, N-oleyl-1,3-propylene diamine, N-tallow-1,3-propylene diamine, a Diamine salt, or an alkyl amine, or diamine acetate.

8. The disinfectant cleaner composition of claim 7, wherein the alkyl amine is bis(3-aminopropyl)alkylamine.

9. The disinfectant cleaner composition of claim 8, wherein the alkyl group has from about 6 to about 18 carbon atoms.

10. The disinfectant cleaner composition of claim 9, wherein the bis(3-aminopropyl)alkylamine comprises N-(3-aminopropyl)-N-dodecylpropane-1,3-diamene.

11. The disinfectant cleaner composition of claim 1, wherein the anionic scale inhibitor further comprises an amino carboxylate.

12. The disinfectant cleaner composition of claim 1, wherein the anionic scale inhibitor is an amino phosphonate.

13. The disinfectant cleaner composition of claim 1, wherein the ethanolamine-N,N-bis(methylene phosphonate) has the formula:

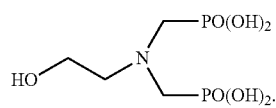

14. The disinfectant cleaner composition of claim 1, wherein the weight % ratio of the at least one biocidal quaternary ammonium compound and the at least one antimicrobial amine is in the range of about 0.1:1 to about 1:1.

15. The disinfectant cleaner composition of claim 1, further comprising an aromatic alcohol.

16. The disinfectant cleaner composition of claim 15, wherein the aromatic alcohol is a phenoxy alkanol having from about 1 to about 6 carbon atoms.

17. The disinfectant cleaner composition of claim 16, wherein the phenoxy alkanol is phenoxy ethanol.

18. The disinfectant cleaner composition of claim 1, further comprising at least one corrosion inhibitor selected from the group comprising silicate, sodium silicate, sodium disilicate, calcium acetate, calcium chloride, calcium gluconate, calcium phosphate, calcium borate, calcium carbonate, calcium citrate, calcium lactate, calcium sulfate, calcium tartrate, benzotriazole, 1,2,3-benzotriazole, or any combination thereof.

19. The disinfectant cleaner composition of claim 18, wherein the at least one corrosion inhibitor is 1,2,3-benzotriazole.

20. The disinfectant cleaner composition of claim 1, further comprising at least one solvent selected from the group comprising water, alcohols, ethanol, isopropanol, 2-butoxy ethanol, 1-decanol, benzyl alcohol, glycerin, monoethanolamine, glycols, ethylene glycol, diethylene glycol, propylene glycol, butoxy diglycol, triethylene glycol, tetraethylene glycol, glycerin, propylene glycol, dipropylene glycol, hexylene glycol, glycol ethers, esters, or combinations thereof, Suitable alcohols include, but are not limited to, ethanol, isopropanol, 2-butoxy ethanol, 1-decanol, benzyl alcohol, glycerin, monoethanolamine, or any combination thereof.

21. The disinfectant cleaner composition of claim 20, wherein the at least one solvent is water.

22. The disinfectant cleaner composition of claim 1, further comprising one or more of an alkali source, a C4-C18 alkyl polyglycoside, and a sequestering agent.

23. The disinfectant cleaner composition of claim 1, wherein the pH of the composition is from about 7 to about 14.

24. The disinfectant cleaner composition of claim 23, wherein the pH of the composition is from about 10 to about 12.

25. A sanitizing composition comprising:
   at least one biocidal quaternary ammonium compound;
   at least one antimicrobial amine; and
   from about 0.1 wt.-% to about 2 wt.-% of an anionic scale inhibitor, comprising ethanolamine-N,N-bis(methylene phosphonate), wherein the weight % ratio of the at least one biocidal quaternary ammonium compound and the at least one antimicrobial amine is in the range of about 0.1:1 to about 1:1; and a solvent.

26. The composition of claim 25, wherein the ethanolamine-N,N-bis(methylene phosphonate) has the formula:

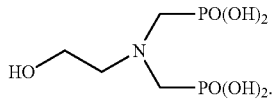

27. The composition of claim 25, wherein the biocidal quaternary ammonium compound comprises one or more alkyl dimethyl benzyl ammonium chlorides and wherein the antimicrobial amine comprises N-(3-aminopropyl)-N-dodecylpropane-1,3-diamene.

28. The composition of claim 25, further comprising at least one phenoxy alkanol and at least one corrosion inhibitor.

29. A sanitizing composition comprising:
a) from about 1 wt.-% to about 30 wt.-% of at least one biocidal quaternary ammonium compound;
b) from about 1 wt.-% to about 30 wt.-% of at least one antimicrobial amine; and
c) from 1 wt.-% to about 10 wt.-% of an anionic scale inhibitor comprising ethanolamine-N,N-bis(methylene phosphonate), wherein the weight % ratio of the at least one biocidal quaternary ammonium compound and the at least one antimicrobial amine is in the range of about 0.1:1 to about 1:1; and
a solvent.

30. A method of sanitizing a surface comprising:
contacting a surface, article, and/or substrate with the sanitizing composition of claim 25.

31. The method of claim 30, wherein the contacting results in inactivation and/or reduction of infectious agents on the surface, article, and/or substrate.

32. The method of claim 30, wherein the infectious agents comprise bacteria, viruses, and/or fungi.

33. A method of making a disinfectant cleaning composition, comprising:
combining the following reagents and agitating until a homogenous solution is formed:
a) at least one biocidal quaternary ammonium compound;
b) at least one antimicrobial amine; and
c) an anionic scale inhibitor comprising ethanolamine-N, N-bis(methylene phosphonate),
wherein the weight % ratio of the at least one biocidal quaternary ammonium chloride and the at least one antimicrobial amine is in the range of about 0.1:1 to about 1:1,
and remains clear and stable when diluted with water which comprises dissolved minerals including calcium, magnesium, and/or manganese.

34. The method of claim 33, further comprising adding one or more phenoxy ethanols, corrosion inhibitors, and/or solvents and mixing until homogenous.

* * * * *